United States Patent
Otake

(10) Patent No.: US 11,643,057 B2
(45) Date of Patent: May 9, 2023

(54) VEHICLE TRAVELING CONTROL APPARATUS

(71) Applicant: TOYOTA JIDOSHA KABUSHIKI KAISHA, Toyota (JP)

(72) Inventor: Hirotada Otake, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 281 days.

(21) Appl. No.: 17/068,437

(22) Filed: Oct. 12, 2020

(65) Prior Publication Data

US 2021/0024045 A1    Jan. 28, 2021

Related U.S. Application Data

(63) Continuation of application No. 15/629,778, filed on Jun. 22, 2017, now Pat. No. 10,836,365.

(30) Foreign Application Priority Data

Jun. 24, 2016  (JP) ................................. 2016-125183

(51) Int. Cl.
*B60T 7/14*    (2006.01)
*B60T 17/22*   (2006.01)
*B60K 28/06*   (2006.01)

(52) U.S. Cl.
CPC ............... *B60T 7/14* (2013.01); *B60K 28/06* (2013.01); *B60T 17/22* (2013.01);
(Continued)

(58) Field of Classification Search
None
See application file for complete search history.

(56) References Cited

U.S. PATENT DOCUMENTS

| 2010/0102988 A1 | 4/2010 | Chen |
| 2012/0028597 A1* | 2/2012 | Chmielewski ......... H04M 11/04 455/404.1 |

(Continued)

FOREIGN PATENT DOCUMENTS

| DE | 10 2011 086 241 A1 | 5/2013 |
| DE | 10 2012 014 717 A1 | 1/2014 |

(Continued)

OTHER PUBLICATIONS

German Office Action dated Feb. 12, 2020 in Patent Application No. 10 2017 113 824.2 (with English translation), 8 pages.

(Continued)

*Primary Examiner* — Todd Melton
*Assistant Examiner* — Jason R Roberson
(74) *Attorney, Agent, or Firm* — Oblon, McClelland, Maier & Neustadt, L.L.P.

(57) ABSTRACT

Driving support ECU transmits a communication connection request to a help net center HNC when a driver of a vehicle has been determined to be in an abnormal state where the driver loses an ability to drive the vehicle, and when the communication connection to the help net center HNC has been established, the driving support ECU transmits the help signal (the positional information of the vehicle) and decelerates the vehicle at a constant deceleration to make the vehicle stop. On the other hand, when the communication connection to the help net center HNC has not been established, the driving support ECU makes the vehicle travel at a constant speed. Accordingly, it is possible to make the vehicle stop under a situation where the help net center HNC recognizes the vehicle position inside which the driver who has been determined to be in the abnormal state is.

10 Claims, 9 Drawing Sheets

(52) U.S. Cl.
CPC ....... *B60T 2201/08* (2013.01); *B60T 2210/36* (2013.01); *B60T 2220/00* (2013.01); *B60T 2260/00* (2013.01); *B60W 2540/26* (2013.01); *B60W 2556/50* (2020.02); *B60W 2756/10* (2020.02); *B60Y 2302/03* (2013.01); *B60Y 2302/05* (2013.01)

(56) References Cited

U.S. PATENT DOCUMENTS

| | | |
|---|---|---|
| 2013/0144465 A1 | 6/2013 | Shida |
| 2013/0278441 A1 | 10/2013 | Rubin et al. |
| 2015/0006012 A1* | 1/2015 | Kammel ............... B60W 50/14 701/23 |
| 2017/0232973 A1 | 8/2017 | Otake |
| 2017/0274906 A1* | 9/2017 | Hassan .................. B60K 28/14 |
| 2017/0369043 A1 | 12/2017 | Otake |
| 2019/0061772 A1 | 2/2019 | Prinz |

FOREIGN PATENT DOCUMENTS

| | | |
|---|---|---|
| DE | 10 2013 016 436 A1 | 4/2015 |
| DE | 10 2015 105 581 A1 | 5/2016 |
| DE | 10 2014 003 783 B4 | 11/2016 |
| JP | 11-306463 A | 11/1999 |
| JP | 2003-237541 A | 8/2003 |
| JP | 2006-315491 | 11/2006 |
| JP | 2008-195402 | 8/2008 |
| JP | 4172434 | 10/2008 |
| JP | 2009-73462 | 4/2009 |
| JP | 2009-190464 | 8/2009 |
| JP | 4349210 | 10/2009 |
| JP | 2009-265760 A | 11/2009 |
| JP | 2010-6279 | 1/2010 |
| JP | 2010-125923 A | 6/2010 |
| JP | 4929777 | 5/2012 |
| JP | 2013-152700 | 8/2013 |
| JP | 2014-021767 A | 2/2014 |
| JP | 2014-148293 | 8/2014 |
| JP | 2016-16762 A | 2/2016 |
| JP | 2016-045714 A | 4/2016 |

OTHER PUBLICATIONS

Office Action dated Dec. 15, 2020 in co-pending U.S. Appl. No. 16/752,150.

* cited by examiner

VEHICLE TRAVELING CONTROL APPARATUS

CROSS-REFERENCE TO RELATED APPLICATIONS

This application is a continuation of U.S. patent application Ser. No. 15/629,778, filed on Jun. 22, 2017, which claims priority from Japanese Patent Application No. 2016-125183, filed on Jun. 24, 2016, the entire contents of which are incorporated herein by reference.

TECHNICAL FIELD

The present invention relates to a vehicle traveling control apparatus which decreases a vehicle speed of a vehicle to stop the vehicle when a driver of the vehicle has fallen into an abnormal state in which the driver loses an ability to drive the vehicle.

BACKGROUND ART

An apparatus has conventionally been proposed which determines whether or not a driver has fallen into an abnormal state where the driver loses an ability to drive a vehicle (for example, a drowsy driving state, a mental and physical failure state, and the like), and decelerates the vehicle when the driver is determined to be in such an abnormal state (for example, refer to Japanese Patent Application Laid-Open (kokai) No. 2009-73462.).

It should be noted that hereinafter an "abnormal state where a driver loses an ability to drive a vehicle" is simply also referred to as an "abnormal state" and a "determination whether or not a driver is in the abnormal state" is simply also referred to as an "abnormality determination of a driver".

SUMMARY OF THE INVENTION

When the driver has fallen into the abnormal state, a rescue request for an emergency facility can be made by using a help network system. In the help network system, a help net center is established where a rescue request is received from a site of an abnormality occurrence, and by reporting to (calling in) the help net center, local emergency facilities are called for service. For example, the help net center acquires a positional information of the vehicle transmitted from a communication device of the vehicle inside which the driver in the abnormal state is. Then, the help net center makes a call for an ambulance as well as a call for a rescue team to head to the vehicle position, and requests a road management station to take care of other vehicles for the stopped vehicle (display messages on electronic message boards and set up traveling restriction signs, and so on, and hereinafter refer to "support other vehicles"), and so on.

When the driver has fallen into the abnormal state, it is desired to rescue the driver by reporting to the help net center as soon as possible. Besides, when a vehicle traveling control apparatus decelerates or stops the vehicle by detecting that the driver is in the abnormal state, it is desired to report to the road management station as soon as possible.

However, if the vehicle is made to stop under a situation where a communication connection between the communication device of the vehicle and the help net center cannot be established, the help net center cannot recognize the position of the vehicle inside which the driver is, and therefore it is considered that it is impossible to properly make the call for an ambulance as well as the call for a rescue team and to request a road management station for supporting other vehicles.

The present invention is made in order to resolve the problem above. That is, one of objects of the present invention is to provide a vehicle traveling control apparatus of a vehicle with which an emergency measure such as a rescue of a driver can be properly taken, using a help network system.

In order to achieve the object above, one feature of a vehicle traveling control apparatus of the present invention lies in that the vehicle traveling control apparatus applied to a vehicle comprises;

abnormality determination means (10, S13, S62, S104, S109) for continuously determining whether or not a driver of the vehicle is in an abnormal state where the driver loses an ability to drive the vehicle;

vehicle position acquisition means (10, 100, 101) for acquiring a positional information representing a current position of the vehicle;

stop traveling means (10, 30, 40, S39, S113) for making the vehicle stop by decreasing a vehicle speed of the vehicle to zero after an abnormality determination point in time which is a point in time at which the driver has been determined to be in the abnormal state; and report means (10, 110, 111, S37) for transmitting to a help net center where a rescue request is arranged the positional information of the vehicle via wireless communication based on a determination result that the driver is in the abnormal state, wherein, the stop traveling means is configured to;

determine (S34) whether or not the report means is in a state of a communication connection to the help net center; and make the vehicle stop (S34: Yes, S39) under a condition that the report means is in the state of a communication connection.

In the present invention, the abnormality determination means continuously conducts the determination whether or not the driver of the vehicle is in the abnormal state in which the driver loses the ability to drive the vehicle. As described later, the abnormality determination of the driver can be conducted by means of various methods. For example, the abnormality determination can be conducted by determining whether or not a state in which the driver does not conduct any operation to drive the vehicle (a state-with-no-driving-operation) continues for more than or equal to a threshold time (a threshold time for the abnormality determination of the driver), or by determining whether or not a state in which the driver does not push a confirmation button even when the driver is urged to push the confirmation button continues for more than or equal to a threshold time, and so on. Alternatively, the abnormality determination can be conducted by using a so called "driver monitor technique" disclosed in Japanese Patent Application Laid-Open (kokai) No. 2013-152700 and so on.

The vehicle position acquisition means acquires the positional information representing a current position of the vehicle. The stop traveling means makes the vehicle stop by decreasing the vehicle speed of the vehicle to zero after the abnormality determination point in time which is a point in time at which the driver has been determined to be in the abnormal state. Besides, the report means transmits to the help net center where the rescue request is arranged the positional information of the vehicle via wireless communication based on the determination result that the driver is in the abnormal state. "Transmitting the positional information of the vehicle to the help net center" means reporting to the help net center that the driver is in the abnormal state. Therefore, hereinafter, "transmitting the positional information of the vehicle to the help net center" is referred to as "reporting".

With this configuration, a call for an ambulance to head to the vehicle position and a request to a road management station for supporting other vehicles and the like can be made at an early timing.

However, if the vehicle is made to stop under a situation where the communication connection between the report means and the help net center cannot be established, the help net center cannot recognize the position of the vehicle inside which the driver is, and therefore it becomes impossible to request for an emergency measure such as a rescue of the driver.

Therefore, the stop traveling means of the present invention determines whether or not the report means is in the state of the communication connection to the help net center, and makes the vehicle stop under the condition that the report means is in the state of the communication connection. Accordingly, it is possible to make the vehicle stop under a situation where the help net center recognizes the position of the vehicle inside which the driver who has been determined to be in the abnormal state is. As a result, according to the present invention, the emergency measure such as the rescue of the driver and the like can be taken properly.

One feature of another aspect of the present invention lies in that;
the stop traveling means is configured to;
start decelerating the vehicle (S113) from a temporary abnormality determination point in time (S108) which is a timing at which the driver has been first determined to be in the abnormal state by the abnormality determination means; and
make the vehicle stop (S39) under a condition where the report means is in the state of a communication connection in a situation where an accuracy of the determination by the abnormality determination means has exceeded an accuracy of a determination at the temporary abnormality determination point in time (S112: Yes, S116: Yes), and
the report means is configured to start transmitting the positional information of the vehicle in the situation where an accuracy of the determination by the abnormality determination means has exceeded an accuracy of a determination at the temporary abnormality determination point in time (S118, S31: Yes).

According to another aspect of the present invention, the deceleration of the vehicle is started from the temporary abnormality determination point in time which is the timing at which the driver has been first determined to be in the abnormal state. At this stage, the positional information of the vehicle is not transmitted to the help net center yet. When the accuracy of the determination by the abnormality determination means has exceeded the accuracy of the determination at the temporary abnormality determination point in time, the report means starts transmitting the positional information of the vehicle. For example, when a determination that the driver is in the abnormal state has continued to be made for a predetermined set time from the temporary abnormality determination point in time, or when a vehicle speed has decreased to a predetermined set vehicle speed greater than zero in a situation where the determination that the driver is in the abnormal state continues to be made, and the like, it can be said that the situation where the accuracy of the determination by the abnormality determination means has exceeded the accuracy of the determination at the temporary abnormality determination point in time is realized.

For example, if the driver has not actually fallen into the abnormal state, it becomes possible to make the driver become aware of the deceleration of the vehicle to induce the driver to conduct an accelerating operation and the like. If there is such a response from the driver, the determination that the driver is in the abnormal state can be cancelled. Accordingly, erroneous reports to the help net center (that is, reporting to the help net center in spite of that the driver is not actually in the abnormal state) can be reduced.

On the other hand, the report means starts transmitting the positional information of the vehicle in the situation where the accuracy of the determination by the abnormality determination means has exceeded the accuracy of the determination at the temporary abnormality determination point in time after the deceleration of the vehicle was started. Besides, the stop traveling means makes the vehicle stop (decelerates the vehicle until the vehicle speed becomes zero) under the condition that the report means is in the state of the communication connection. Therefore, it is possible to make the vehicle stop under a situation where the help net center recognizes the position of the vehicle inside which the driver who has been determined to be in the abnormal state is. Accordingly, the emergency measure such as the rescue of the driver and the like can be taken properly.

One feature of another aspect of the present invention lies in that;
the stop traveling means is configured to stop decelerating the vehicle (S42: No, S43, S35) when a communication between the report means and the help net center is interrupted in midst of deceleration for making the vehicle stop.

For example, owing to the vehicle entering a tunnel and the like, there may be a case that the communication between the report means and the help net center is interrupted in midst of the deceleration for making the vehicle stop. If the vehicle is made to stop in such a case, it becomes impossible for the help net center to recognize the position of the vehicle inside which the driver who has been determined to be in the abnormal state is.

Therefore, in another aspect of the present invention, in a case when the communication between the report means and the help net center is interrupted in midst of the deceleration for making the vehicle stop, that is, in midst of the deceleration of the vehicle for decreasing the vehicle speed of the vehicle to zero, the stop traveling means stops decelerating the vehicle not to make the vehicle stop. For example, the stop traveling means makes the vehicle travel at a constant speed. Accordingly, it is possible to move the vehicle to a position where the communication between the report means and the help net center can be resumed. Therefore, the communication between the report means and the help net center is ensured to be made at a position where the vehicle stops, and as a result, the emergency measure such as the rescue of the driver and the like can be taken properly.

One feature of another aspect of the present invention lies in that;
the stop traveling means is configured not to make the vehicle stop (S47: Yes, S36) until a stop permission signal is transmitted from the help net center.

In another aspect of the present invention, the stop traveling means does not make the vehicle stop until the stop permission signal is transmitted from the help net center. For example, the stop traveling means makes the vehicle travel at a constant speed until the stop traveling means receives the stop permission signal transmitted from the help net center. Therefore, it is possible to make the vehicle stop under a more appropriate situation.

One feature of another aspect of the present invention lies in that;

the stop traveling means is configured to make the vehicle stop (S52: Yes, S53) when a state in which a communication connection between the report means and the help net center cannot be established has continued for more than an upper limit time set in advance.

For example, in a case when a communication failure and the like of the help network system occurred, the state in which the communication connection between the report means and the help net center cannot be established continues all long. Therefore, the stop traveling means makes the vehicle stop when a time during which the communication connection between the report means and the help net center cannot be established has exceeded the upper limit time set in advance. Accordingly, it is possible to cope with the aforementioned failure occurrence.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

A vehicle traveling control apparatus (driving support apparatus) according to an embodiment of the present invention will be described below, referring to figures.

Figure 1:
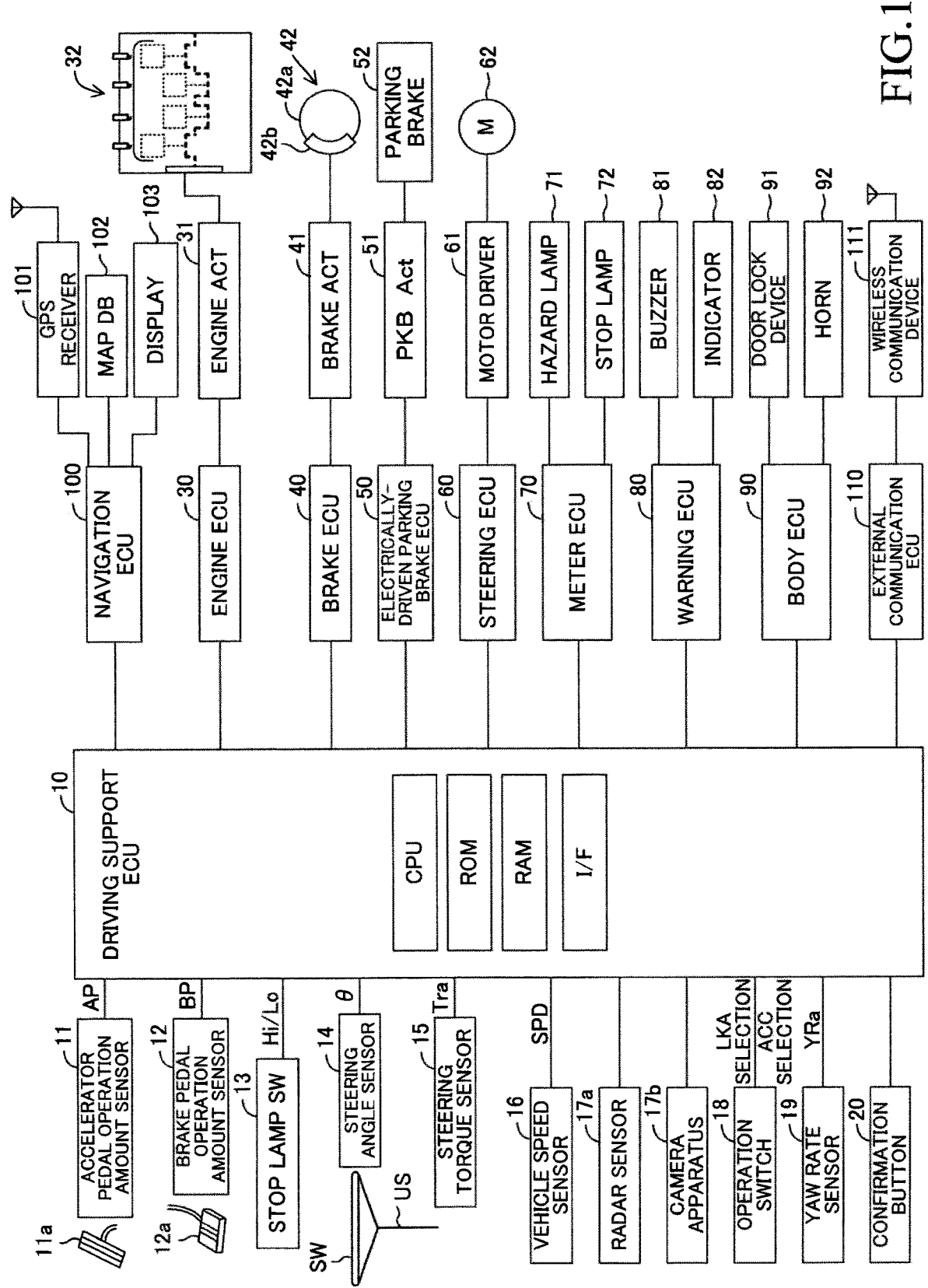
FIG. 1 is a schematic configuration diagram of a vehicle traveling control apparatus according to an embodiment of the present invention.

A vehicle traveling control apparatus according to the embodiment of the present invention is, as shown in FIG. 1, applied to a vehicle (hereinafter, may be referred to as an "own vehicle" in order to distinguish it from other vehicles), and comprises a driving support ECU 10, an engine ECU 30, a brake ECU 40, an electrically-driven parking brake ECU 50, a steering ECU 60, a meter ECU 70, a warning ECU 80, a body ECU 90, a navigation ECU 100, and an external communication ECU 110.

Each of the ECUs is an electric control unit comprising a microcomputer as a main part. Those ECUs are connected via CAN (Controller Area Network) which is not illustrated so that the ECUs are capable of mutually transmitting and receiving information. In the present specification, the microcomputer includes CPU, ROM, RAM, a non-volatile memory, an interface I/F, or the like. The CPU is configured to realize/perform various functions by executing instructions (i.e., programs or routines) stored in the ROM. Some of those ECUs or all of those ECUs may be integrated into one ECU.

The driving support ECU 10 is connected to sensors (including switches) listed below, and is configured to receive a detection signal or an output signal of these sensors. It should be noted that each sensor may be connected to ECUs other than the driving support ECU 10. In this case, the driving support ECU 10 receives the detection signal or the output signal of the sensor via CAN from the ECU to which the sensor is connected.

An accelerator pedal operation amount sensor 11 is configured to detect an operation amount (an accelerator position) of an accelerator pedal 11a of the own vehicle, and to output a signal representing the accelerator pedal operation amount AP.

A brake pedal operation amount sensor 12 is configured to detect an operation amount of a brake pedal 12a of the own vehicle, and to output a signal representing the brake pedal operation amount BP.

A stop lamp switch 13 is configured to output a low level signal when the brake pedal 12a is not being depressed (is not being operated), and to output a high level signal when the brake pedal 12a is being depressed (is being operated).

A steering angle sensor 14 is configured to detect a steering angle of the own vehicle, and to output a signal representing the steering angle θ.

A steering torque sensor 15 is configured to detect a steering torque added to a steering shaft US of the own vehicle by an operation of a steering wheel SW, and to output a signal representing the steering torque Tra.

A vehicle speed sensor 16 is configured to detect a traveling speed (a vehicle speed) of the own vehicle, and to output a signal representing the vehicle speed SPD.

A radar sensor 17a is configured to obtain information regarding a road ahead of the own vehicle, and a three-dimensional object present in the road. The three-dimensional object includes, for example, moving objects such as a pedestrian, a bicycle and an automobile, and static objects such as a power pole, a tree, and a guardrail. Hereinafter, these three-dimensional objects may be referred to as a "target object."

The radar sensor 17a comprises a "radar transmission/reception part and a signal processor", both of which are not illustrated.

The radar transmission/reception part emits an electric wave in a millimeter waveband (hereinafter, referred to as a "millimeter wave") to an ambient region of the own vehicle including a front region of the own vehicle, and receives a millimeter wave (i.e., a reflected wave) reflected from a target object which is present in the emitted area.

The signal processor obtains, every predetermined period of time, an inter-vehicle distance (a longitudinal distance), a relative speed, a lateral distance, a relative lateral speed, and the like, with respect to each detected target object based on a phase difference between the transmitted millimeter wave and the received reflected wave, an attenuation level of the reflected wave, a time from a point in time of transmitting the millimeter wave to a point in time of receiving the reflected wave, or the like.

A camera apparatus 17b comprises a "stereo camera and an image processor", both of which are not illustrated.

The stereo camera photographs/captures landscapes of a left-side region and a right-side region in front of the vehicle to obtain a left-and-right pair of image data.

The image processor is configured to calculate information as to whether or not a target object is present, a relative relationship between the own vehicle and the target object and the like, based on the left-and-right pair of image data photographed/captured by the stereo camera to output them.

It should be noted that the driving support ECU 10 is configured to determine a relative relationship (target object information) between the own vehicle and the target object by composing the relative relationship between the own vehicle and the target object obtained by the radar sensor 17a and the relative relationship between the own vehicle and the target object obtained by the camera apparatus 17b. Further, the driving support ECU 10 is configured to recognize a lane marker such as a left white line and a right white line of a road (hereinafter, simply referred to as a "white line") based on the left-and-right pair of image data (road image data) photographed/captured by the camera apparatus 17b and to obtain a shape of the road (a curvature radius representing a degree of how much the road is curved), a positional relationship between the road and the vehicle, and the like. In addition, the driving support ECU 10 is configured to also obtain the information whether or not a road side wall exists based on the image data photographed/captured by the camera apparatus 17b.

An operation switch 18 is a switch to be operated by a driver. The driver can select whether or not to perform a traffic lane keeping control (LKA: Lane Keeping Assist control) by operating the operation switch 18. Moreover, the driver can select whether or not to perform a trailing inter-vehicle distance control (ACC: Adaptive Cruise Control) by operating the operation switch 18.

A yaw rate sensor 19 is configured to detect a yaw rate of the own vehicle to output an actual yaw rate YRa.

A confirmation button 20 is arranged at a position capable of being operated by the driver. The confirmation button 20 is configured to output a low-level signal when not being operated and to output a high-level signal when being pressed.

The driving support ECU 10 is configured to perform the LKA and the ACC. Further, as described later, the driving support ECU 10 is configured to determine whether or not the driver is in an abnormal state in which the driver loses an ability to drive the vehicle, and to perform various types of control to perform appropriate processes when the driver is determined to be in the abnormal state.

The engine ECU 30 is connected to an engine actuator 31. The engine actuator 31 includes actuators for changing a driving state of an internal combustion engine 32. In the present embodiment, the internal combustion engine 32 is a gasoline fuel injection, spark ignition, multi-cylinder engine, and comprises a throttle valve to adjust an intake air amount. The engine actuator 31 includes at least a throttle valve actuator to change an opening degree of the throttle valve. The engine ECU 30 can change torque which the internal combustion engine 32 generates by driving the engine actuator 31. The torque which the internal combustion engine 32 generates is transmitted to a non-illustrated driving wheels via a non-illustrated transmission gear. Therefore, the engine ECU 30 can control the engine actuator 31 to control a driving force of the own vehicle, so as to change an acceleration state (an acceleration rate).

The brake ECU 40 is connected to a brake actuator 41. The brake actuator 41 is provided in a hydraulic circuit between a non-illustrated master cylinder to compress operating fluid with a depression force of the brake pedal and friction brake mechanisms 42 provided at left-and-right-front wheels and left-and-right-rear wheels. Each of the friction brake mechanisms 42 comprises a brake disc 42a fixed to the wheel and a brake caliper 42b fixed to a vehicle body. The brake actuator 41 adjusts, in response to an instruction from the brake ECT 40, a hydraulic pressure that is supplied to a wheel cylinder which is built in the brake caliper 42, and operates the wheel cylinder with the hydraulic pressure. Thereby, the brake actuator 41 presses a brake pad onto the brake disc 42a to generate a friction braking force. Accordingly, the brake ECU 40 can control the braking force of the own vehicle by controlling the brake actuator 41.

The electrically-driven parking brake ECU (hereinafter, may be referred to as an "EPB ECU") 50 is connected to a parking brake actuator (hereinafter, may be referred to as a "PKB actuator") 51. The PKB actuator 51 is an actuator for pressing the brake pad onto the brake disc 42a or for, in a case when comprising a drum brake, pressing a shoe onto a drum rotating with the wheel. Therefore, EPB ECU 50 can add a parking brake force to the wheel by means of the PKB actuator 51 to maintain the vehicle in a stop state.

The steering ECU 60 is a control apparatus of a well-known electrically-driven power steering system and is connected to a motor driver 61. The motor driver 61 is connected to a steering motor 62. The steering motor 62 is incorporated into a non-illustrated "steering mechanism including the steering wheel, the steering shaft coupled to the steering wheel, a gear mechanism for steering, and the like" of the vehicle. The steering motor 62 generates torque with electric power supplied from the motor driver 61 to be able to add a steering assist torque using the torque, or to turn left-and-right steered wheels.

The meter ECU 70 is connected to a non-illustrated digital indication type meter and is also connected to a hazard lamp 71 and a stop lamp 72. The meter ECU 70 can, in response to an instruction from the driving support ECU 10, make the hazard lamp 71 blink and make the stop lamp 72 light.

The warning ECU 80 is connected to a buzzer 81 and an indicator 82. The warning ECU 80 can, in response to an instruction from the driving support ECU 10, make the buzzer 81 sound to alert the driver, make a mark for alerting (for example, a warning lamp) light on the indicator 82, display a warning message on the indicator 82, and display an operating state of a driving support control on the indicator 82.

The body ECU 90 is connected to a door lock device 91 and a horn 92. The body ECU 90 can unlock the door lock device 91 in response to an instruction from the driving support ECU 10. In addition, the body ECU 90 can make the horn 92 sound in response to an instruction from the driving support ECU 10.

The navigation ECU 100 is connected to a GPS receiver 101, a map database 102, a touch-screen display 103, and so on. The GPS receiver 101 receives a GPS signal for detecting a current position of the own vehicle. The map database 102 stores map information etc. The touch-screen display 103 is a human machine interface. The navigation ECU 100 identifies the current position of the own vehicle based on the GPS signal, and performs various types of processing based on the own vehicle position and on the map information etc. stored in the map database 102 to perform a route guidance using the display 103.

The map information stored in the map database 102 includes road information. The road information includes parameters representing a shape of a road for every section (for example, a curvature radius or a curvature of a road representing a degree of curve of the road). It should be noted that the curvature is a reciprocal of the curvature radius.

Figure 2:
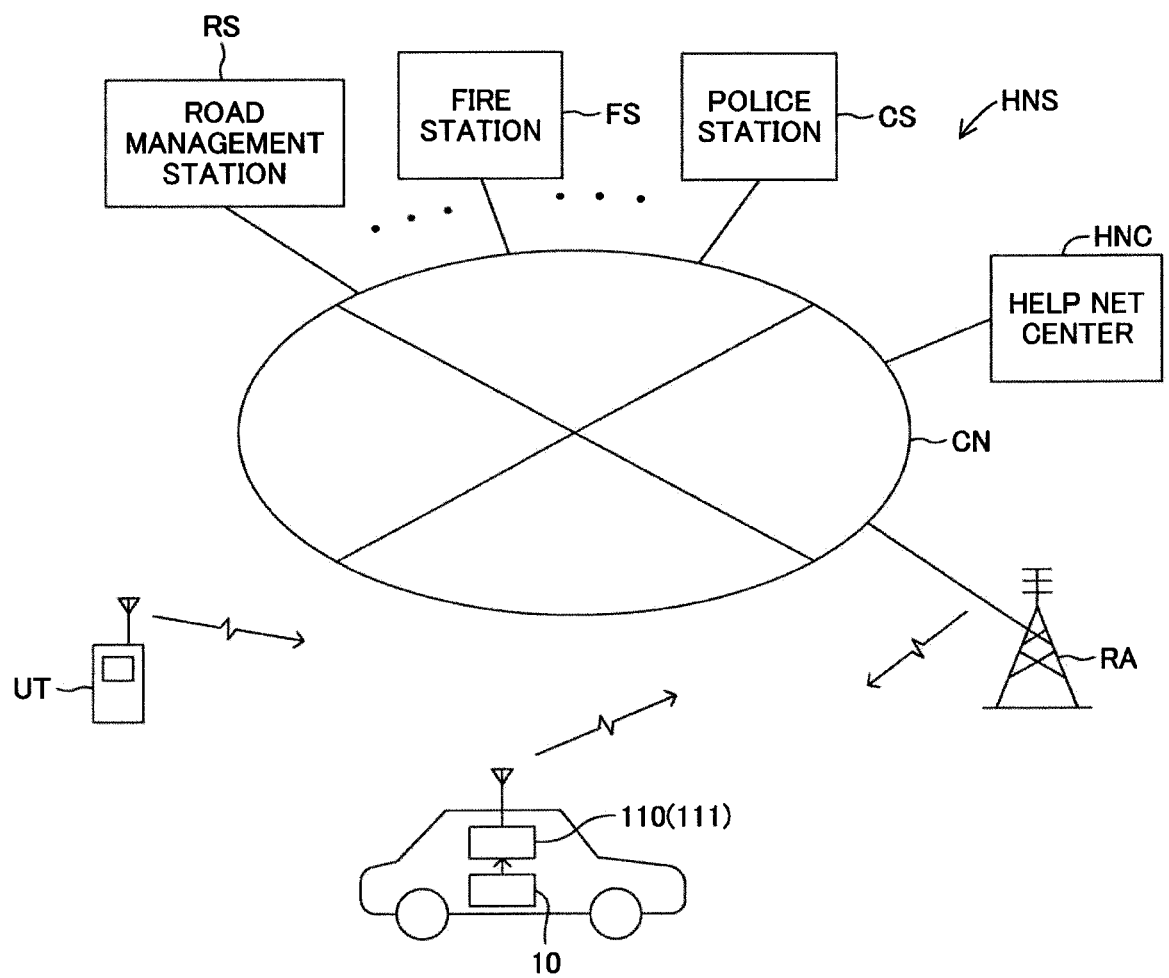
FIG. 2 is a schematic configuration diagram of a help network system.

The external communication ECU 110 is connected to a wireless communication device 111. The external communication ECU 110 and the wireless communication device 111 are wireless communication terminals for connecting to a help network system. As shown in FIG. 2, the help network system HNS is configured by including a communication network CN, and a help net center HNC connected to the communication network CN, and a fire station FS, a police station CS and a road management station RS, each of which is connected to the communication network CN (hereinafter, these may also be referred to as an "on-site processing department".), and a wireless relay base station RA connected to the communication network CN, and user communication terminals UT which the user of this system possesses. One of the user communication terminals UT corresponds to the external communication ECU 110 (including the wireless communication device 111). It should be noted that the help net center HNC, the fire station FS, the police station CS and the road management station RS, each of which is connected to the communication network CN means a communication device provided at each of those institutions.

Upon reception of a help net connection instruction from the driving support ECU 10, the external communication ECU 110 actuates the wireless communication device 111 to perform a communication connection to the help net center HNC. The help net center HNC comprises a communication device for transmitting/receiving signals to/from unspecified large number of user communication terminals UT. In the present specification, "communicating with the help net center" means communicating with the communication device provided at the help net center HNC.

In addition, the external communication ECU 110 comprises a microphone and a speaker for a telephone call with an operator at the help net center HNC, and is also configured to report on-site information to the operator from an inside of the own vehicle. Further, the external communication ECU 110 comprises a call button as well for calling the help net center HNC. It should be noted that in the present embodiment, processing under the following situation will be described, that is, the situation where the driver is in the abnormal state in which the driver cannot perform driving operations, namely, the driver cannot make a telephone call with the operator using these functions.

Upon reception of the help net connection instruction from the driving support ECU 10, the external communication ECU 110 obtains from the navigation ECU 100 the current position of the own vehicle detected with the GPS receiver 21, and transmits to the help net center HNC a signal (hereinafter, may be referred to as a "help signal") including a vehicle position information representing the current position and an ID number which identifies the own vehicle (for example, a vehicle number). As will be described later, the driving support ECU 10 continuously performs a determination whether or not the driver is in the abnormal state in which the driver loses the ability to drive the vehicle while the vehicle is traveling. The driving support ECU 10 transmits the help net connection instruction to the external communication ECU 110 when the driver has been determined to be in the abnormal state. The external communication ECU 110 transmits the help signal to the help net center HNC using the wireless communication device 111 based on this help net connection instruction.

Upon reception of the help signal, the help net center HNC searches for an on-site processing department in charge of an area where the vehicle which has transmitted the help signal is positioned, and transmits various types of information to the searched on-site processing department. The on-site processing department dispatches emergency vehicles such as an ambulance, a police vehicle and so on to the site based on the various types of information transmitted from the help net center HNC, and then rescues the driver, carries the driver to a hospital as well as supports other vehicles (displays messages on electronic message boards and sets up traveling restriction signs, and so on).

<Summary of Control Processing>

Next, summary of the control processing performed by the driving support ECU 10 will be described. The driving support ECU 10 repeatedly determines whether or not "the driver is in the abnormal state in which the driver loses the ability to drive the vehicle (may be simply referred to as an "abnormal state")" while the vehicle is traveling.

When the driving support ECU 10 has detected that the driver is in the abnormal state, the driving support ECU 10 transmits a communication connection request to the help net center HNC. The driving support ECU 10 does not start decelerating the vehicle until the communication connection to the help net center HNC is established. When the communication connection to the help net center HNC is established, the driving support ECU 10 starts transmitting the help signal to the help net center HNC. On the other hand, the help signal cannot be transmitted to the help net center HNC until the communication connection to the help net center HNC is established. During that time (that is, while the communication connection to the help net center HNC is not established), the driving support ECU 10 does not start the deceleration of the vehicle, but makes the vehicle travel at a constant speed so that a vehicle speed at that point in time (a point in time at which the abnormal state has been detected) is maintained.

The traveling control of the vehicle stated above is conducted when the driver's abnormality is detected under a situation where a trailing inter-vehicle distance control (ACC) is being conducted. When the trailing inter-vehicle distance control is being conducted, the vehicle travels without an accelerator pedal operation by the driver. Therefore, in a case when the driver's abnormality is being detected, a deceleration control which makes a vehicle decelerate at a predetermined target deceleration or a constant speed control which maintains a vehicle speed are conducted in place of the trailing inter-vehicle distance control. In this case, when the driver's abnormality is detected, it is preferable that the driving support ECU 10 starts the traffic lane keeping control (LKA) if the traffic lane keeping control (LKA) has not been conducted.

Now, the traffic lane keeping control and the trailing inter-vehicle distance control will be described first.

<Traffic Lane Keeping Control (LKA)>

The traffic lane keeping control (hereinafter, referred to as "LKA") is a control to support a steering operation of the driver by adding the steering torque to the steering mechanism so that a position of the own vehicle is kept nearby (in the vicinity of) a target traveling line in a "lane on which the own vehicle is traveling (a traveling lane)". The LKA itself is well known (for example, refer to Japanese Patent Applications Laid-Open (kokai) No. 2008-195402, No. 2009-

190464, No. 2010-6279, and Japanese Patent No. 4349210, and so on.). Therefore, a simple description will next be made below.

The driving support ECU 10 performs the LKA when the LKA is being requested by the operation of the operation switch 18. The driving support ECU 10 recognizes (obtains) "the left white line LL and the right white line LR" of the lane on which the own vehicle is traveling based on the image data transmitted from the camera apparatus 17b when the LKA is being requested, and determines a central position of a pair of these white lines to be a target traveling line Ld. In addition, the driving support ECU 10 calculates a curve radius (a curvature radius) R of the target traveling line Ld, and a position and a direction of the own vehicle in a traveling line defined by the left white line LL and the right white line LR.

Then, the driving support ECU 10 calculates a distance Dc (hereinafter, referred to as a "center distance Dc") in a width direction of a road between a central position of a front end of the own vehicle and the target traveling line Ld, and a deviation angle θy (hereinafter, referred to as a "yaw angle θy") between a direction of the target traveling line Ld and the traveling direction of the own vehicle.

Further, the driving support ECU 10 calculates a target yaw rate YRc* using the following formula (1) based on the center distance Dc, the yaw angle θy, and a road curvature ν (=1/curvature radius R) every time a predetermined calculation interval elapses. In the formula (1), K1, K2 and K3 are control gains. The target yaw rate YRc* is a yaw rate set so that the own vehicle can travel along the target traveling line Ld.

$$YRc^* = K1 \times Dc + K2 \times \theta y + K3 \times \nu \quad (1)$$

The driving support ECU 10 calculates a target steering torque Tr* for obtaining the target yaw rate YRc* based on the target yaw rate YRc* and the actual yaw rate YRa every time a predetermined calculation interval elapses. More specifically, the driving support ECU 10 stores a lookup table in advance which defines a relationship between a "deviation between the target yaw rate YRc* and the actual yaw rate YRa" and the "target steering torque Tr*", and calculates the target steering torque Tr* by applying the deviation between the target yaw rate YRc* and the actual yaw rate YRa to the table. Thereafter, the driving support ECU 10 controls the steering motor 62 using the steering ECU 60 so that the actual steering torque Tra matches with (becomes equal to/coincides with) the target steering torque Tr*. It should be noted that the LKA is a control that only assists a steering wheel operation by the driver such that the own vehicle travels along the target traveling line, and the LKA is not a control that permits "driving without holding the steering wheel". Therefore, the driver is required to hold the steering wheel. The above description is a summary of the LKA.

<Trailing Inter-Vehicle Distance Control (ACC)>

The trailing inter-vehicle distance control (hereinafter, referred to as "ACC") is a control to make the own vehicle trail the preceding vehicle traveling right ahead the own vehicle, while keeping the inter-vehicle distance between the preceding vehicle and the own vehicle to be/at a predetermined distance. The ACC itself is well known (for example, refer to Japanese Patent Applications Laid-Open (kokai) No. 2014-148293 and No. 2006-315491, and Japanese Patents No. 4172434, and No. 4929777 and so on.) Therefore, a simple description will be made below.

The driving support ECU 10 performs the ACC in a case when the ACC is being requested by the operation of the operation switch 18.

More specifically, the driving support ECU 10 selects a trailing target vehicle (i.e., a trailing objective vehicle) based on the target object information obtained by the radar sensor 17a and the camera apparatus 17b in a case when the ACC is being requested. For example, the driving support ECU 10 determines whether or not a relative position of the target object (n) identified by the lateral distance Dfy(n) and the inter-vehicle distance Dfx(n) of the detected target object (n) exists (or, is present) in a trailing target vehicle area which is set in advance so as to have a lateral length that becomes smaller as the inter-vehicle distance becomes larger. Thereafter, when the relative position of the target object exists (or, is present) in the trailing target vehicle area for more than or equal to a predetermined time, the driving support ECU 10 selects the target object (n) as the trailing target vehicle.

Further, the driving support ECU 10 calculates a target acceleration Gtgt using either a formula (2) or a formula (3) below. In the formula (2) and the formula (3), a Vfx(a) is a relative speed of the trailing target vehicle (a), k1 and k2 are predetermined positive gains (coefficients), and ΔD1 is an inter-vehicle deviation obtained by subtracting a "target inter-vehicle distance Dtgt" from an "inter-vehicle distance Dfx(a) of the trailing target vehicle (a)" (=Dfx(a)−Dtgt). It should be noted that the target inter-vehicle distance Dtgt is calculated by multiplying a target inter-vehicle time Ttgt which is set by the driver by using the operation switch 18 by the vehicle speed SPD of the own vehicle (that is, Dtgt=Ttgt×SPD).

The driving support ECU 10 determines the target acceleration Gtgt by using (in accordance with) the following formula (2) in a case when the value (k1×ΔD1+k2×Vfx(a)) is positive or "0". Ka1 is a positive gain (coefficient) for an acceleration and is set to be a value less than or equal to be "1".

The driving support ECU 10 determines the target acceleration Gtgt by using (in accordance with) the following formula (3) in a case when the value (k1×ΔD1+k2×Vfx(a)) is negative. Kd1 is positive a gain (coefficient) for a deceleration and is set to be "1" in the present embodiment.

$$Gtgt \text{ (for the acceleration)} = ka1 \times (k1 \times \Delta D1 + k2 \times Vfx(a)) \quad (2)$$

$$Gtgt \text{ (for the deceleration)} = kd1 \times (k1 \times \Delta D1 + k2 \times Vfx(a)) \quad (3)$$

It should be noted that in a case when the target object does not exist (or not be present) in the trailing target vehicle area, the driving support ECU 10 determines the target acceleration Gtgt based on a "target speed which is set depending on the target inter-vehicle time Ttgt" and the vehicle speed SPD, in such a manner that the vehicle speed SPD matches with (becomes equal to) the target speed.

The driving support ECU 10 controls the engine actuator 31 through the engine ECU 30, and when needed, controls the brake actuator 41 through the brake ECU 40 in such a manner that the acceleration of the own vehicle matches with the target acceleration Gtgt. The above description is a summary of the ACC.

<Specific Control Routine>

Next, the traveling control processing performed by the driving support ECU 10 will be described. The driving support ECU 10 performs the traveling control of the vehicle and at the same time, controls a report to the help net center HNC by performing the following routines in parallel, that is, a routine under a normal state shown in FIG. 3 and a routine under an abnormal state shown in FIG. 4 every time a predetermined calculation interval elapses.

The driving support ECU 10 sets the current driver's state, classifying the state into "normal" and "abnormal", and stores the set state. An abnormality flag Fe is used as information showing the driver's state. The value of the abnormality flag Fe being "1" means that the current state of the driver is "abnormal". At a point in time when the ignition key is turned on, the abnormality flag Fe is initialized to be set to "0" (Fe=0).

Figure 3:
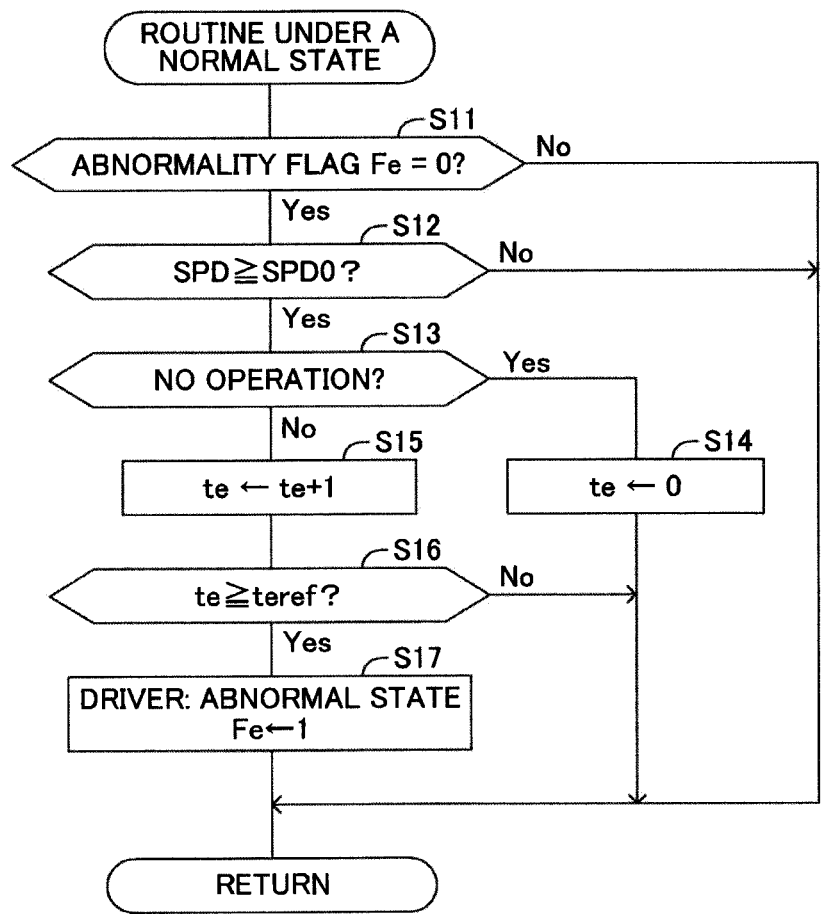
FIG. 3 is a flowchart showing a routine under a normal state.
Figure 4:
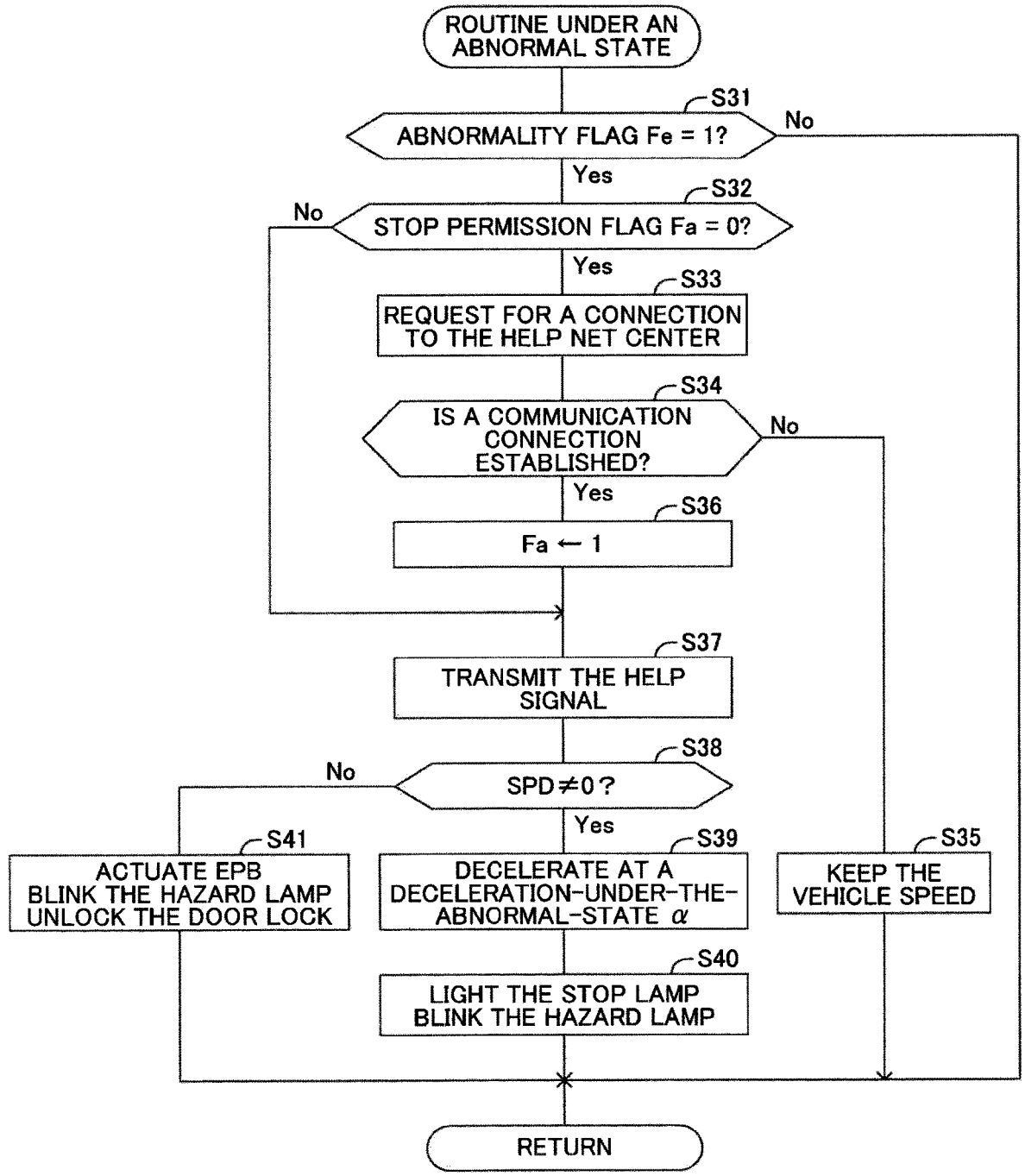
FIG. 4 is a flowchart showing a routine under an abnormal state.

When an ignition switch is turned on, the routines in FIG. 3 and FIG. 4 start. In this case, since the abnormality flag Fe has been initialized (Fe=0), the routine under the normal state in FIG. 3 substantially functions. Hereinafter, a description will be made, starting with the routine under the normal state in FIG. 3. It should be noted that the routine under the normal state in FIG. 3 will be activated when the ACC is being performed.

When the routine under the normal state is started, the driving support ECU 10 determines, at a step S11, whether or not the abnormality flag Fe is "0". The driving support ECU 10 makes an "Yes" determination since the abnormality flag Fe has been initialized right after the ignition switch was turned on. In this case, the driving support ECU 10 proceeds to a step S12 to determine whether or not the vehicle speed SPD is more than or equal to an abnormality determination permission vehicle speed SPD0 set in advance. The driving support ECU 10 tentatively terminates this routine under the normal state in a case when the vehicle speed SPD does not reach the abnormality determination permission vehicle speed SPD0.

In a case when the vehicle speed SPD is determined to be more than or equal to the abnormality determination permission vehicle speed SPD0 (S12: Yes) as a result of repeating the determination processes stated above, the driving support ECU 10 determines, at a step S13, whether or not the driver is in a state where the driver does not perform any driving operation (a state-with-no-driving-operation). The state-with-no-driving-operation is a state where any of parameters consisting of one or more combinations of "the accelerator pedal operation amount AP, the brake pedal operation amount BP, the steering torque Tra, and a signal level of the stop lamp switch 13" which vary depending on a driver does not change. In the present embodiment, the driving support ECU 10 regards a state where any of "the accelerator pedal operation amount AP, the brake pedal operation amount BP, and the steering torque Tra" does not change as well as the steering torques remains "0" as the state-with-no-driving-operation.

In a case when the current state is not the state-with-no-driving-operation (S13: Yes), the driving support ECU 10 clears, at a step S14, a value of an abnormality determination timer te to zero and tentatively terminates the routine under the normal state. The value of the abnormality determination timer te is set to "0" when the ignition switch is turned on.

When the state-with-no-driving-operation is detected as a result of repeating the processes stated above, the driving support ECU 10 increases, at a step S15, the value of the abnormality determination timer te by "1" on all such occasions. Therefore, the value of the abnormality determination timer te represents a time during which the state-with-no-driving-operation continues.

Next, the driving support ECU 10 determines, at a step S16, whether or not the value of the abnormality determination timer te is more than or equal to an abnormality confirmation time teref set in advance. When the duration time of the state-with-no-driving-operation is less than the abnormality confirmation time teref, the driving support ECU 10 tentatively terminates the routine under the normal state.

When an operation by the driver is detected (S13: Yes) in the middle of the repetition of the processes stated above, the value of the abnormality determination timer te is cleared to zero at the step S14.

On the other hand, when the value of the abnormality determination timer te reaches the abnormality confirmation time teref without any driving operations by the driver being detected (S16: Yes), the driving support ECU 10 determines that the driver is in the abnormal state where the driver loses the ability to driver the vehicle, and proceeds to a step S17 to set the abnormality flag Fe to "1". After the abnormality flag Fe was set to "1", a determination at the step S11 becomes "No", and the routine under the abnormal state (FIG. 4) will substantially function in place of the routine under the normal state (FIG. 3).

It should be noted that when the abnormality flag Fe is set to "1", the driving support ECU 10 is preferred to automatically perform the LKA. That is, it is preferable that the driving support ECU 10 forcibly perform the LKA even when the operation switch 18 is not selected to perform the LKA. Accordingly, even when the driver does not perform the steering operation, the own vehicle can be made to travel along the target traveling line (the central position of the left and right white lines). In addition, when the abnormality flag Fe is set to "1", the driving support ECU 10 stops the ACC, and makes the vehicle decelerate or travel at a constant speed as described later.

Besides, when any operation by the driver is not detected, an alert to the driver may be started at an arbitrary timing at which the value of the abnormality determination timer te has not reached the abnormality confirmation time teref. For example, the driving support ECU 10 outputs a no-driving-operation warning instruction to the warning ECU 80 when the value of the abnormality determination timer te exceeds a warning start time tal. Accordingly, the warning ECU 80 makes a warning sound from the buzzer 81, makes a warning lamp blink on the indicator 82, and displays a warning message urging the driver to operate any one of "the accelerator pedal 11a, the brake pedal 12a, and the steering wheel SW".

Next, the routine under the abnormal state (FIG. 4) performed by the driving support ECU 10 will be described. When the routine under the abnormal state (FIG. 4) is started, the driving support ECU 10 determines, at a step S31, whether or not the abnormality flag Fe is "1". The driving support ECU 10 makes an "Yes" determination right after the abnormality flag Fe was set to "1" in the routine under the normal state, and proceeds to a step S32. The driving support ECU 10 determines, at the step S32, whether or not a stop permission flag Fa is set to "0".

The stop permission flag Fa is an information showing whether or not the vehicle is in a situation where stopping the vehicle is permitted when the driver is determined to be in the abnormal state. The value of the stop permission flag Fa being "1" means that the vehicle is in the situation where stopping the vehicle is permitted. The stop permission flag Fa being "0" means that the vehicle is in a situation where stopping the vehicle is not permitted. At a point in time when the ignition key is turned on, the stop permission flag Fa is initialized to be set to "0" (Fa=0). Therefore, the driving support ECU 10 makes an "Yes" determination when performing a determination process of the step S32 for the first time.

When the driving support ECU 10 makes an "Yes" determination at the step S32, the driving support ECU 10 outputs, at a subsequent step S33, the help net connection instruction to the external communication ECU 110. Accordingly, the external communication ECU 110 transmits the communication connection request to the help net center HNC via the wireless communication device 111. In this case, the communication connection request may be transmitted to the help net center HNC by transmitting the help signal to the help net center HNC.

Next, the driving support ECU 10 determines, at a step S34, whether or not the communication connection between the wireless communication device 111 and the help net center HNC (hereinafter, simply referred to as the "communication connection") is established. When the communication connection is established, the external communication ECU 110 transmits to the driving support ECU 10 a communication result signal representing an establishment of the communication connection. Therefore, the driving support ECU 10 performs the determination of the step S34 based on whether or not the driving support ECU 10 has received the communication result signal transmitted from the external communication ECU 110.

It should be noted that in this step S34, the communication connection is determined to be established when a response to the communication connection request is received from the help net center HNC. However, for example, a determination whether or not a wireless communication environment where the vehicle is currently positioned is not "out of range" (that is, a state of the communication connection) may be performed in the step S34.

When the communication connection is not established, the driving support ECU 10 keeps, at a step S35, the vehicle speed at the current vehicle speed. In this case, the driving support ECU 10 outputs to the engine ECU 30 and the brake ECU 40 an instruction signal for making the own vehicle travel at a constant speed of the current vehicle speed SPD obtained based on the signal from the vehicle speed sensor 16. Accordingly, a traveling state of the own vehicle becomes a state of traveling at a constant speed. It should be noted that in a case when the traveling at a constant speed is continued, it is preferable that the driving support ECU 10 stores a vehicle speed of when the traveling at a constant speed was started and keeps that vehicle speed. In addition, the process at the step S35 does not necessarily require that the vehicle speed of the own vehicle is kept at the current vehicle speed. The vehicle may be made to travel at a constant speed set in advance (a safe vehicle speed). The driving support ECU 10 tentatively terminates the routine under the abnormal state after performing the process of the step S35.

When the communication connection between the wireless communication device 111 and the help net center HNC is established (S34: Yes) as a result of repeating the processes stated above, the driving support ECU 10 proceeds to a step S36, and sets the stop permission flag Fa to "1" (Fa=1). Subsequently, the driving support ECU 10 outputs, at the step S37, a transmission instruction of the help signal to the external communication ECU 110. Accordingly, the help signal is transmitted to the help net center HNC from the wireless communication device 111. The help signal is a signal representing that the driver is in the abnormal state where the driver loses the ability to drive the vehicle, and includes the positional information of the own vehicle at the current time and the ID for identifying the own vehicle. It should be noted that the help signal may be information including at least the positional information of the own vehicle.

Next, the driving support ECU 10 determines, at a step S38, whether or not the own vehicle is not in a stop state based on the vehicle speed SPD. When this determination is made for the first time, the driving support ECU 10 makes an "Yes" determination since the own vehicle is not in the stop state. Based on this determination, the driving support ECU 10 proceeds to a step S39, and decelerates the own vehicle at an acceleration-under-the-abnormal-state a which is a target acceleration with a constant value set in advance. In this case, the driving support ECU 10 calculates an acceleration of the own vehicle from a change amount of the vehicle speed SPD per unit time obtained based on the signal from the vehicle speed sensor 16, and outputs to the engine ECU 30 and the brake ECU 40 an instruction signal for matching the acceleration thereof with the acceleration-under-the-abnormal-state a.

Subsequently, the driving support ECU 10 outputs, at a step S40, a lighting instruction of the stop lamp 72 and a blinking instruction of the hazard lamp 71 to the meter ECU 70. As a result, the stop lamp 72 lights and the hazard lamp 71 blinks, making it possible to alert a driver of a following vehicle. The driving support ECU 10 tentatively terminates the routine under the abnormal state after performing the process of the step S40.

The driving support ECU 10 decelerates the own vehicle, transmitting the help signal to the help net center HNC by repeating the processes described above. Accordingly, the help net center HNC can make an emergency dispatch request to the on-site processing department which is in charge of the area where the own vehicle is positioned.

When the vehicle speed SPD reaches zero by the deceleration of the own vehicle, that is, when the own vehicle stops (S38: No), the driving support ECU 10 outputs, at a step S41, an actuation instruction of the electrically-driven parking brake to the electrically-driven parking brake ECU 50, the blinking instruction of the hazard lamp 71 to the meter ECU 70, and an unlock instruction of the door lock device 91 to the body ECU 90. Accordingly, the electrically-driven parking brake is brought into an actuation state, a blinking state of the hazard lamp 71 is continued, and the door lock device 91 is brought into an unlock state. In addition, the driving support ECU 10 prohibits the acceleration override (invalidate an acceleration request based on the accelerator pedal operation) while the own vehicle is in the stop state. The driving support ECU 10 tentatively terminates the routine under the abnormal state after performing the process of the step S41.

According to the vehicle traveling control apparatus of the present embodiment described above, when the state-with-no-driving-operation has continued for more than or equal to the abnormality confirmation time teref (S16: Yes), the driver is determined to have fallen into the abnormal state, and the communication connection request is transmitted to the help net center HNC. Stopping the vehicle (decelerating the vehicle for making the vehicle stop) is not permitted until it is detected that the communication connection between the wireless communication device 111 and the help net center HNC is established, that is, until it is confirmed that a situation where the help signal can be transmitted to the help net center HNC is realized. Besides, while the communication connection between the wireless communication device 111 and the help net center HNC is not established, the vehicle speed of the own vehicle is maintained even after the driver was determined to have fallen into the abnormal state. That is, it is possible to keep the own vehicle in the traveling state so that the own vehicle does not stop until the communication connection is established.

For example, when the driver of the own vehicle has been determined to be in the abnormal state in a tunnel, it is difficult to establish the communication connection between the wireless communication device 111 and the help net center HNC. In this case, it is possible to make the own vehicle travel at a constant speed until a situation where the own vehicle comes out of the tunnel and the aforementioned communication connection is established is realized.

As a result, according to the vehicle traveling control apparatus of the present embodiment, since stopping the vehicle (decelerating the vehicle for making the vehicle stop) is permitted under a situation where the help net center HNC can surely recognize the position of the own vehicle, it becomes possible to properly make the call for an ambulance as well as the call for a rescue team and to request a road management station for supporting other vehicles.

Modification Example 1 of a Routine Under an Abnormal State

For example, in midst of the deceleration for making the vehicle stop, owing to the vehicle entering a tunnel and the like, there may be a case that the communication between the wireless communication device 111 and the help net center HNC is interrupted after the communication connection was once established. If the vehicle is made to stop in such a case, it becomes impossible for the help net center HNC to recognize the position of the vehicle inside which the driver who has been determined to be in the abnormal state is.

Therefore, in a modification example 1 of the routine under the abnormal state, in a case when the communication between the wireless communication device 111 and the help net center HNC is interrupted in midst of the deceleration for making the vehicle stop, the driving support ECU 10 stops a decelerated traveling and switches to a traveling at a constant speed (a constant speed traveling).

Figure 5:
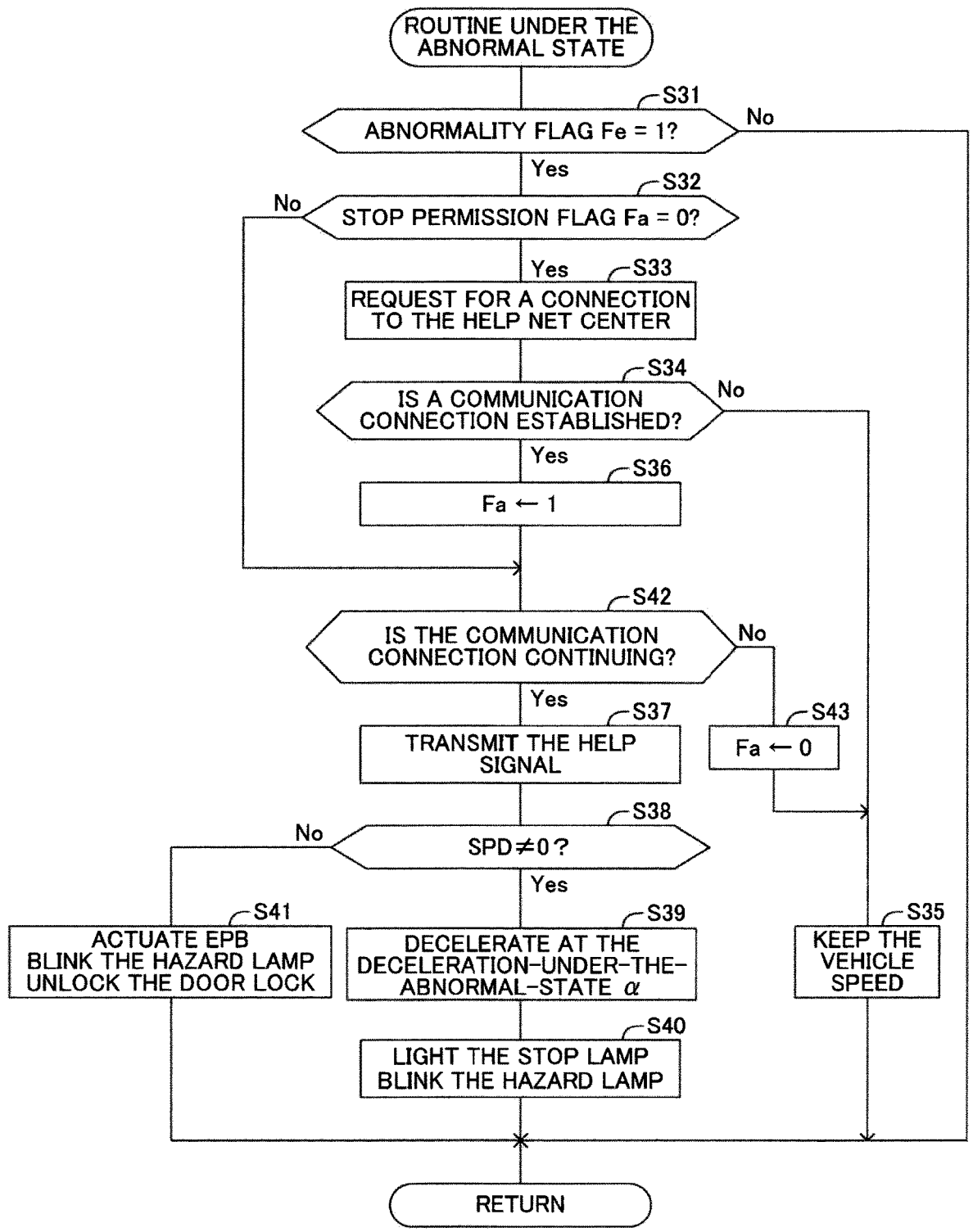
FIG. 5 is a flowchart showing a modification example 1 of the routine under the abnormal state.

FIG. 5 shows the modification example 1 of the routine under the abnormal state. The driving support ECU 10 repeatedly performs a routine under the abnormal state of the modification example 1 (FIG. 5) instead of the routine under the abnormal state of the embodiment (FIG. 4) every time a predetermined calculation interval elapses. Hereinafter, only a simple description will be made for processes same as the processes of the embodiment by adding the same step numbers to FIG. 5. The routine under the abnormal state of the modification example 1 corresponds to the routine under the abnormal state of the embodiment to which processes of a step S42 and a step S43 are added.

When the communication connection between the wireless communication device 111 and the help net center HNC is established and the stop permission flag Fa is set to "1" (S36) after the routine under the abnormal state of the modification example 1 was started, the driving support ECU 10 proceeds to a step S42. The driving support ECU 10 determines, at the step S42, whether or not the communication connection between the wireless communication device 111 and the help net center HNC continues. The driving support ECU 10 makes an "Yes" determination right after the stop permission flag Fa was set to "1" at the step S36, and in this case, the driving support ECU 10 proceeds to the aforementioned step S37 (the transmission process of the help signal).

On the other hand, when the communication connection between the wireless communication device 111 and the help net center HNC is interrupted, the driving support ECU 10 makes a "No" determination at the step S42. In this case, the driving support ECU 10 sets, at the step S43, the stop permission flag Fa to "0" (Fa=0), and proceeds to the step S35 to make the own vehicle travel at a constant speed so that the current vehicle speed is maintained.

Therefore, after the stop permission flag Fa was set to "0" at the step S43, the communication connection request is to be transmitted again to the help net center HNC by the processes from the step S33. When the communication connection is again established (S34: Yes) as a result of repeating the processes stated above, the transmission of the help signal to the help net center HNC (S37) and the deceleration of the own vehicle (S39) are started.

According to the modification example 1 of the routine under the abnormal state described above, when the communication between the wireless communication device 111 and the help net center HNC is interrupted in midst of the deceleration for making the vehicle stop, the driving support ECU 10 stops the decelerated traveling and switches to the constant speed traveling. Accordingly, it is possible to move the vehicle to a position where the communication between the wireless communication device 111 and the help net center HNC can be resumed. Therefore, the communication between the wireless communication device 111 and the help net center HNC is ensured to be made at a position where the vehicle stops, and as a result, the emergency measure such as the rescue of the driver and the like can be taken properly.

Modification Example 2 of the Routine Under the Abnormal State

In this modification example 2 of the routine under the abnormal state, a permission condition for making the vehicle stop is that the stop permission signal is transmitted to the own vehicle from the help net center HNC. That is, the driving support ECU 10 does not make the own vehicle stop until the driving support ECU 10 receives the stop permission signal from the help net center HNC even if the communication connection between the wireless communication device 111 and the help net center HNC is established.

Figure 6:
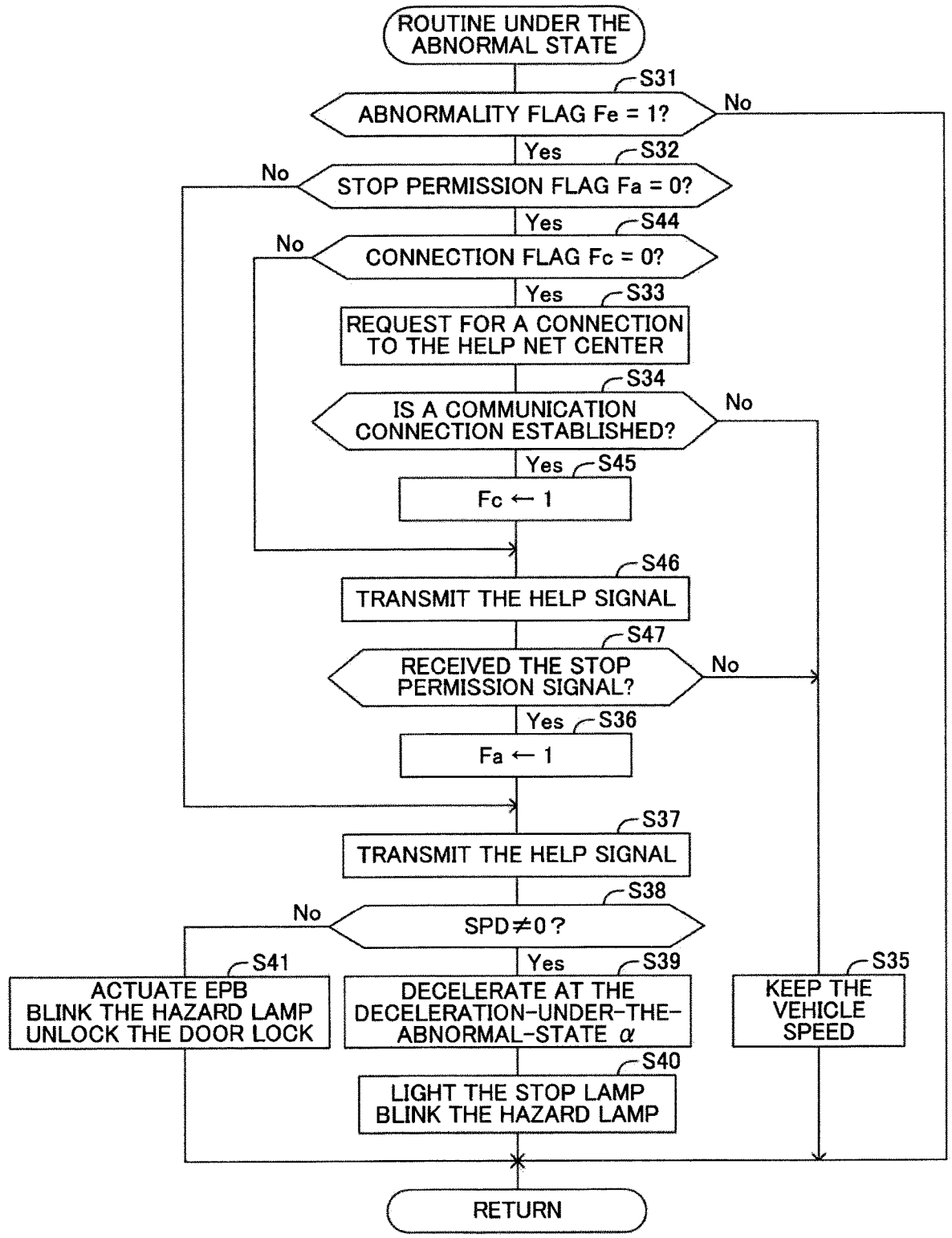
FIG. 6 is a flowchart showing a modification example 2 of the routine under the abnormal state.

FIG. 6 shows the modification example 2 of the routine under the abnormal state. The driving support ECU 10 repeatedly performs a routine under the abnormal state of the modification example 2 (FIG. 6) instead of the routine under the abnormal state of the embodiment (FIG. 4) every time a predetermined calculation interval elapses. Hereinafter, only a simple description will be made for processes same as the processes of the embodiment by adding the same step numbers to FIG. 6. The routine under the abnormal state of the modification example 2 corresponds to the routine under the abnormal state of the embodiment to which processes of steps S44, S45, S46, and S47 are added between the step S32 and the step S36.

After the routine under the abnormal state of the modification example 2 was started, the driving support ECU 10 makes an "Yes" determination at the step S31 and the step S32, and proceeds to the step S44. The driving support ECU 10 determines, at the step S44, whether or not a connection flag Fc is set to "0".

The connection flag Fc is an information showing whether or not the communication connection between the wireless communication device 111 and the help net center HNC is established. The value of the connection flag Fc being "1"

means that the communication connection is established. The value of the connection flag Fc being "0" means that the communication connection is not established. At a point in time when the ignition key is turned on, the connection flag Fc is initialized to be set to "0" (Fc=0). Therefore, the driving support ECU 10 makes an "Yes" determination when performing a determination process of the step S44 for the first time.

When the connection flag Fc is "0", the driving support ECU 10 outputs, at the step S33, the help net connection instruction to the external communication ECU 110, and while the communication connection is not established (S34: No), keeps the vehicle speed of the own vehicle at the current vehicle speed at the step S35. When the communication connection between the wireless communication device 111 and the help net center HNC is established (S34: Yes) as a result of repeating the processes stated above, the driving support ECU 10 sets, at the step S45, the connection flag Fc to "1". Subsequently, the driving support ECU 10 outputs, at the step S46, the transmission instruction of the help signal to the external communication ECU 110. Accordingly, the help signal is transmitted to the help net center HNC from the wireless communication device 111. The help net center HNC makes an emergency dispatch request to the on-site processing department which is in charge of the area where the own vehicle is positioned based on the help signal.

Subsequently, the driving support ECU 10 determines, at the step S47, whether or not the stop permission signal was transmitted from the help net center HNC.

When the road management station RS which is one of the on-site processing departments receives an emergency dispatch request from the help net center HNC, the road management station RS performs a preparation for making the vehicle inside which the driver who has fallen into the abnormal state is (may be referred to as the "vehicle") stop. This preparation includes, for example, a display of a message of "emergency stop vehicle" using electronic message boards, an activation of a smoke candle, a regulation of traveling lanes for other vehicles with pylons and the like, and so on. When the aforementioned preparation has been finished, the road management station RS transmits a preparation finished signal to the help net center HNC. When the help net center HNC has received the preparation finished signal from the road management station RS, the help net center HNC transmits the stop permission signal to the wireless communication device 111 of the vehicle.

When the stop permission signal has not been transmitted from the help net center HNC (that is, when the driving support ECU 10 has not received the stop permission signal) at the step S47, the driving support ECU 10 proceeds to the step S35 and keeps the vehicle speed of the own vehicle at the current vehicle speed. When it is detected that the stop permission signal has been transmitted from the help net center HNC (S47: Yes) as a result of repeating the processes stated above, the driving support ECU 10 proceeds to the step S36, and sets the stop permission flag Fa to "1". Accordingly, the deceleration of the own vehicle is started and eventually the own vehicle stops.

According to the modification example 2 of the routine under the abnormal state, the deceleration of the own vehicle is not started until the driving support ECU 10 receives the stop permission signal from the help net center HNC, for example, until the road management station RS finishes the preparation after having transmitted the help signal to the help net center HNC. Therefore, it is possible to keep an impact on other vehicles caused by making the own vehicle stop (collision, traffic jam and the like) to a minimum.

Modification Example 3 of the Routine Under the Abnormal State

In the aforementioned embodiment, when the abnormal state of the driver was detected, the driving support ECU 10 decelerates the own vehicle to make the own vehicle stop at a stage where the communication connection between the wireless communication device 111 and the help net center HNC has been established. However, the following case may be considered that the communication connection is not established for some reason. For example, a case where a communication failure has occurred in the help net system HNS may correspond to such a case.

Therefore, in the modification example 3 of the routine under the abnormal state, in a case when the communication connection between the wireless communication device 111 and the help net center HNC cannot be established for more than or equal to a predetermined time in spite of transmitting the communication connection request to the help net center HNC, the driving support ECU 10 stops the constant speed traveling of the own vehicle and makes the own vehicle stop.

Figure 7:
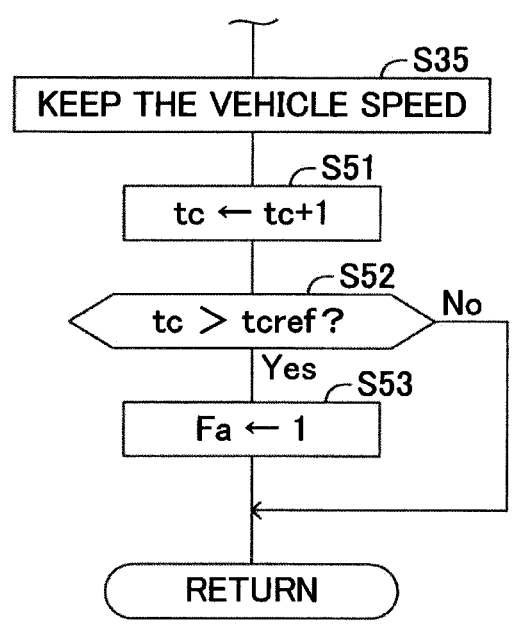
FIG. 7 is a flowchart showing a modification example 3 of the routine under the abnormal state.

FIG. 7 shows the modification example 3 of the routine under the abnormal state. A flowchart shown in FIG. 7 is a partial flowchart showing processes which are added to after the step S35 in the routine under the abnormal state of the embodiment (FIG. 4).

After the driving support ECU 10 makes the own vehicle travel at a constant speed at the step S35, the driving support ECU 10 proceeds to a step S51, and increases a value of a communication failure timer tc by "1". The value of this communication failure timer tc has been set to "0" when the ignition switch is turned on. Therefore, the communication failure timer tc represents a time during which the communication connection is not established in spite of transmitting the communication connection request to the help net center HNC, in other words, a time during which stopping the vehicle is not permitted after the driver has been determined to be in the abnormal state.

Subsequently, the driving support ECU 10 determines, at a step S52, whether or not the value of the communication failure timer tc has exceeded the communication abnormality determination time tcref set in advance. When the value of the communication failure timer tc is less than or equal to the communication abnormality determination time tcref, the driving support ECU 10 tentatively terminates the routine under the abnormal state. The driving support ECU 10 repeats the processes stated above. Therefore, when the value of the communication failure timer tc is less than or equal to the communication abnormality determination time tcref, the own vehicle continues to be made to travel at a constant speed. When any abnormality has not occurred in a communication system, the communication connection between the wireless communication device 111 and the help net center HNC is established before the value of the communication failure timer tc reaches the communication abnormality determination time tcref. Therefore, the processes after the step S35 will not be performed.

On the other hand, when some abnormality has occurred in the communication system, the value of the communication failure timer tc exceeds the communication abnormality determination time tcref (S52: Yes). In this case, the driving support ECU 10 sets, at a step S53, the stop permission flag Fa to "1", and tentatively terminates the routine under the abnormal state. Therefore, when the routine under the abnormal state is resumed, the deceleration of the own vehicle is started (the processes progress in the following order, S32, S37, S38, S39). Accordingly, it is possible to make the own vehicle stop.

According to the modification example 3 of the routine under the abnormal state described above, when a time during which the communication connection between the wireless communication device 111 and the help net center HNC cannot be established, in other words, a time during which stopping the vehicle is not permitted after the driver has been determined to be in the abnormal state has exceeded the communication abnormality determination time tcref, the own vehicle is decelerated so that the own vehicle stops. Therefore, it is possible to cope with the occurrence of communication failures in the help network system HNS.

It should be noted that the modification example 3 of the routine under the abnormal state can be also applied to the modification example 1 or the modification example 2 of the routine under the abnormal state. In this case as well, when the time during which stopping the vehicle is not permitted after the driver has been determined to be in the abnormal state has exceeded the communication abnormality determination time tcref, the own vehicle is decelerated so that the own vehicle stops.

Modification Example 4 of the Routine Under the Abnormal State

It is considered that the driver's state comes back to the normal state from the abnormal state after the driving support ECU 10 determined that the driver was in the abnormal state. Therefore, in the modification example 4 of the routine under the abnormal state, processes of when the driver's state has come back to the normal state are added.

Figure 8:
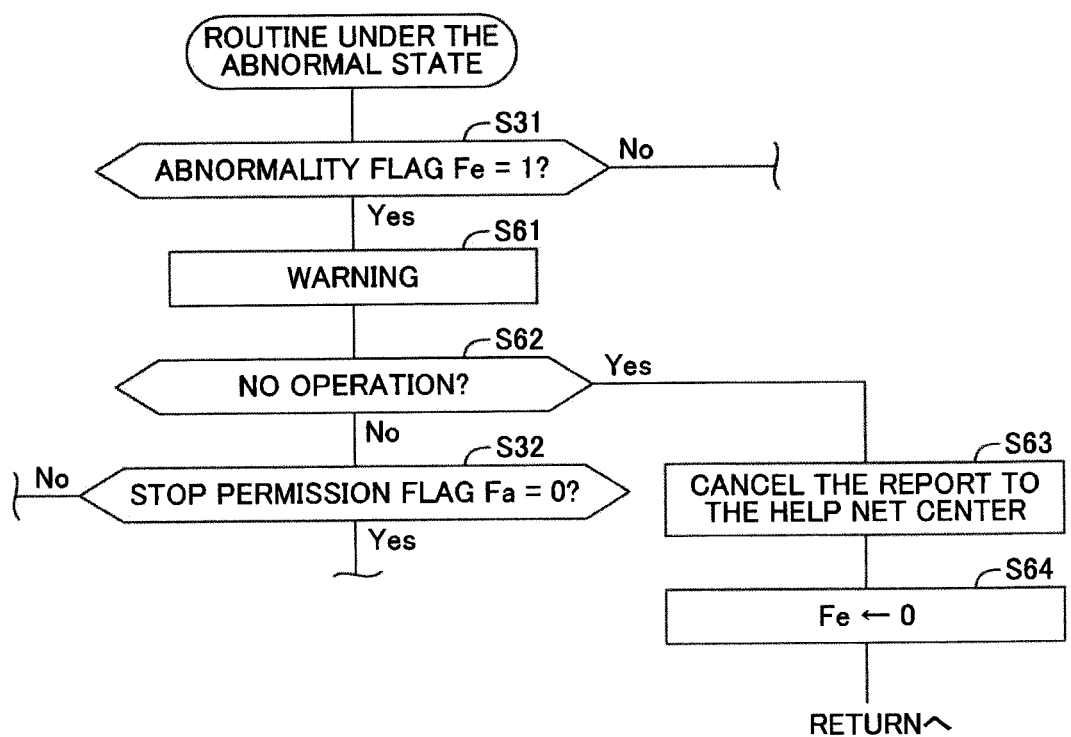
FIG. 8 is a flowchart showing a modification example 4 of the routine under the abnormal state.

FIG. 8 shows the modification example 4 of the routine under the abnormal state. A flowchart shown in FIG. 8 is a partial flowchart showing processes which are added to between the step S31 and the step S32 in the routines under the abnormal state of the embodiment and the modification examples 1 to 3.

After the driving support ECU 10 determined, at the step S31, that the abnormality flag Fe is "1", the driving support ECU 10 proceeds to a step S61, and outputs a no-driving-operation warning instruction to the warning ECU 80. Accordingly, the warning ECU 80 makes a warning sound from the buzzer 81, makes a warning lamp blink on the indicator 82, and displays a warning message urging the driver to operate any one of "the accelerator pedal 11a, the brake pedal 12a, and the steering wheel SW".

Subsequently, the driving support ECU 10 determines, at a step S62, whether or not the driver is in a state where the driver does not perform any driving operation (a state-with-no-driving-operation). This determination process may be the same as the determination processes in the step S13 in the routine under the normal state, or may require a detection of a more specific driving operation than the above-mentioned driving operations. The driving support ECU 10 proceeds to the step S32 when the state where the driver does not perform any driving operation remains unchanged.

When the driving operation by the driver has been detected (S62: Yes) in midst of repeating the processes stated above, the driving support ECU 10 proceeds to a step S63 and transmits a cancel signal (a signal representing that the driver is not in the abnormal state and that the rescue of the driver and the support for other vehicles became unnecessary) to the help net center HNC. It should be noted that when the help signal has not been transmitted to the help net center HNC yet at this point in time, the process of the step 63 is not necessary.

Next, the driving support ECU 10 sets, at a step S64, the abnormality flag Fe to "0", and tentatively terminates the routine under the abnormal state. In this case, the processes such as the deceleration control of the own vehicle, the warning, the alert to the following vehicle, and so on which had been performed until that time are terminated, and a usual vehicle control (a vehicle control based only on the operations by the driver) will be resumed. In addition, after that, the routine under the normal state (FIG. 3) will substantially function in place of the routine under the abnormal state.

According to the modification example 4 of the routine under the abnormal state described above, in a case when it has been detected that the driver's state comes back to the normal state from the abnormal state after having transmitted the help signal to the help net center HNC, the cancel signal is transmitted to the help net center HNC. Accordingly, a rescue of the driver, a support for other vehicles, and the like can be canceled properly.

Modification Example 1 of the Routine Under the Normal State

Next, a modification example 1 of the routine under the normal state will be described. In this modification example 1, the driving support ECU 10 repeatedly determines whether or not "the driver is in the abnormal state in which the driver loses the ability to drive the vehicle" while the vehicle is traveling. The driving support ECU 10 classifies a current state of the driver into the following three phases, "normal", "temporarily abnormal", and "regularly abnormal", and performs processes corresponding to each phase. When the driver has been first determined to be in the abnormal state, the driving support ECU 10 changes the state of the driver from "normal" which had been set until that time to "temporarily abnormal".

When the driving support ECU 10 sets the driver's state to "temporarily abnormal", the driving support ECU 10 warns the driver for urging the driver to conduct driving operations, and forces the vehicle to decelerate at a constant deceleration. It is preferred that the driving support ECU 10 starts the LKA if the LKA has not been conducted.

When the driver resumes the driving operations after having recognized the warning or the deceleration of the vehicle, the driving support ECU 10 detects the driving operations by the driver and changes the driver's state from "temporarily abnormal" which had been set until that time back to "normal". In this case, the warning to the driver and the deceleration of the vehicle which had been performed until that time are terminated.

On the other hand, when a predetermined time has passed without any driving operation by the driver being conducted in spite of warning to the driver and decelerating the own vehicle, it is highly likely that the driver is in the abnormal state. Therefore, when the vehicle speed decreases to a predetermined speed after the deceleration of the own vehicle was started and when a duration time during which the driver's state is set to "temporarily abnormal" becomes more than or equal to the predetermined time, the driving support ECU 10 sets the driver's state to "abnormal".

The driving support ECU 10 sets the current driver's state, classifying the state into "normal", "temporarily abnormal", and "abnormal", and stores the set state. A temporary abnormality flag Fet and an abnormality flag Fe are used as information showing the driver's state. The value of the temporary abnormality flag Fet being "1" means that the current state of the driver is "temporarily abnormal". The value of the abnormality flag Fe being "1" means that the current state of the driver is "abnormal". The values of the temporary abnormality flag Fet and the abnormality flag Fe being both "0" means that the current state of the driver is "normal". At a point in time when the ignition key is turned on, the temporary abnormality flag Fet and the abnormality flag Fe are initialized to be set to "0", respectively (Fet=0, Fe=0).

Figure 9:
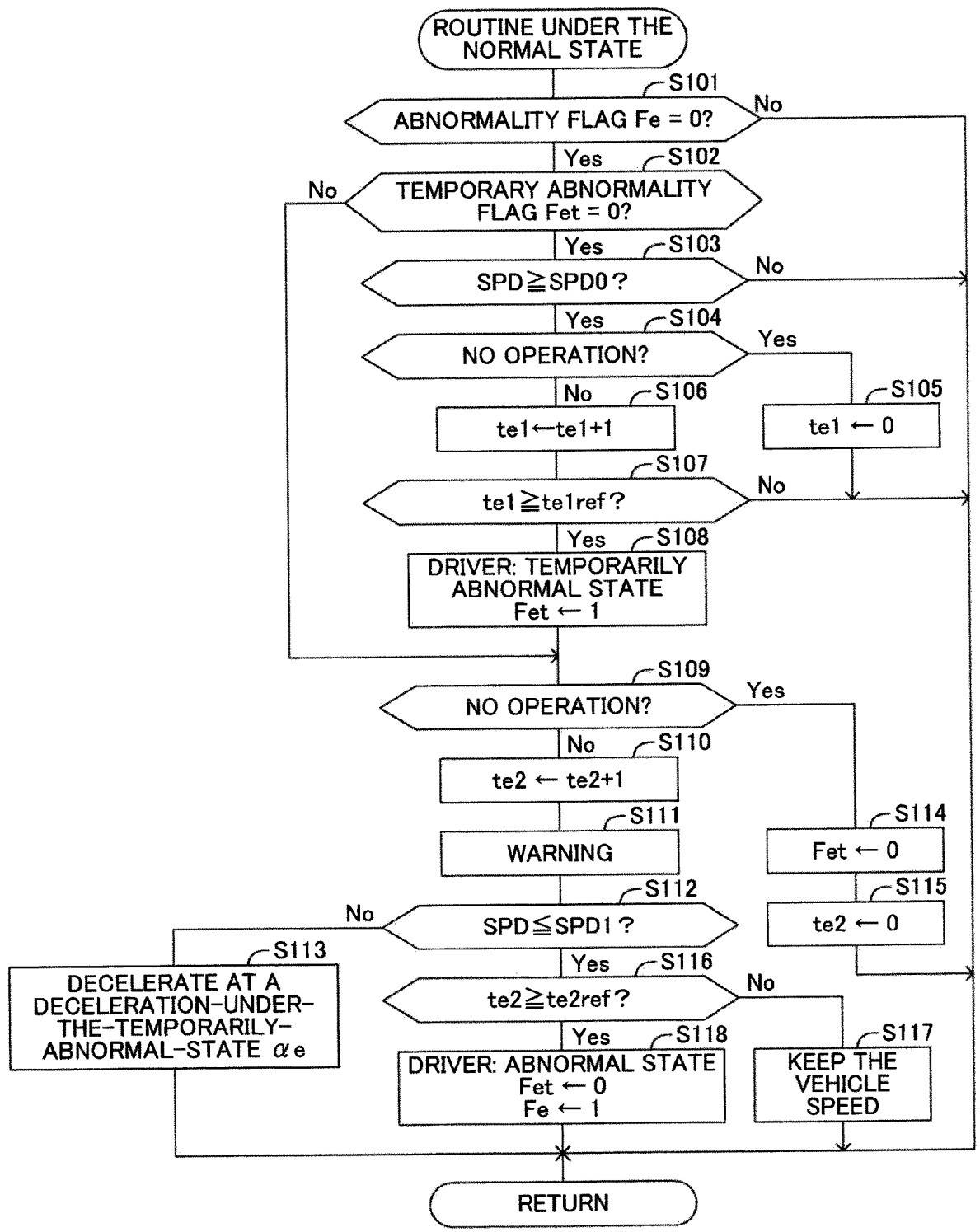
FIG. 9 is a flowchart showing a modification example 1 of the routine under the normal state.

FIG. 9 shows a flowchart showing the modification example 1 of the routine under the normal state. When the ignition switch is turned on, the routine under the normal state of this modification example 1 starts in place of the routine under the normal state of the embodiment (FIG. 3). It should be noted that this routine under the normal state is activated when the ACC is being conducted.

The driving support ECU 10 determines, at a step S101, whether or not the abnormality flag Fe is "0". The driving support ECU 10 makes an "Yes" determination at the step S101 since the abnormality flag Fe has been initialized right after the ignition switch was turned on. In this case, the driving support ECU 10 proceeds to a step S102 to determine whether or not the temporary abnormality flag Fet is "0". The driving support ECU 10 makes an "Yes" determination at the step S102 since the temporary abnormality flag Fet has been initialized as well right after the ignition switch was turned on.

In this case, the driving support ECU 10 proceeds to a step S103 to determine whether or not the vehicle speed SPD is more than or equal to the abnormality determination permission vehicle speed SPD0 set in advance. The driving support ECU 10 tentatively terminates this routine under the normal state in a case when the vehicle speed SPD is less than the abnormality determination permission vehicle speed SPD0.

In a case when the vehicle speed SPD is determined to be more than or equal to the abnormality determination permission vehicle speed SPD0 (S103: Yes), the driving support ECU 10 determines, at a step S104, whether or not the driver is in a state where the driver does not perform any driving operation (a state-with-no-driving-operation). A method for determining the state-with-no-driving-operation is the same as the method of the step S13 in the embodiment.

In a case when the current state is not the state-with-no-driving-operation (S104: Yes), the driving support ECU 10 clears, at a step S105, a value of a temporary abnormality determination timer te1 to zero and tentatively terminates the routine under the normal state. The value of the temporary abnormality determination timer te1 is set to "0" when the ignition switch is turned on.

When the state-with-no-driving-operation is detected as a result of repeating the processes stated above, the driving support ECU 10 increases, at a step S106, the value of the temporary abnormality determination timer te1 by "1". Therefore, the value of the temporary abnormality determination timer te1 represents a time during which the state-with-no-driving-operation continues.

Next, the driving support ECU 10 determines, at a step S107, whether or not the value of the temporary abnormality determination timer te1 is more than or equal to a temporary abnormality confirmation time te1ref set in advance. When the duration time of the state-with-no-driving-operation is less than the temporary abnormality confirmation time te1ref, the driving support ECU 10 tentatively terminates the routine under the normal state.

When an operation by the driver is detected (S104: Yes) in the middle of the repetition of the processes stated above, the value of the temporary abnormality determination timer te1 is cleared to zero at the step S105.

On the other hand, when the value of the temporary abnormality determination timer te1 reaches the temporary abnormality confirmation time te1ref without any driving operations by the driver being detected (S107: Yes), the driving support ECU 10 proceeds to a step S108 to set the temporary abnormality flag Fet to "1". A timing at which the temporary abnormality flag Fet has been set to "1" is a timing at which the driving support ECU 10 has first determined that the driver is in the abnormal state where the driver loses the ability to drive the vehicle (that is, has temporarily determined that the driver is in the abnormal state). After the temporary abnormality flag Fet was set to "1", a determination at the step S102 becomes "No", and after that, the processes of the step S103 to the step S108 are skipped and processes after a step S109 will be repeatedly performed.

It should be noted that when the temporary abnormality flag Fet is set to "1", or when the abnormality flag Fe is set to "1", the driving support ECU 10 is preferred to automatically perform the LKA. That is, it is preferable that the driving support ECU 10 forcibly perform the LKA even when the operation switch 18 is not selected to perform the LKA. Accordingly, even when the driver does not perform the steering operation, the own vehicle can be made to travel along the target traveling line (the central position of the left and right white lines).

In addition, when the temporary abnormality flag Fet is set to "1", or when the abnormality flag Fe is set to "1", the driving support ECU 10 stops the ACC, and makes the vehicle decelerate or travel at a constant speed as described later.

The driving support ECU 10 determines, at a step S109, whether or not the driver is in the state where the driver does not perform any driving operation (the state-with-no-driving-operation). This determination is the same as the determination process of the step S104. When the vehicle is in the state-with-no-driving-operation (S109: No), the driving support ECU 10 proceeds to a step S110 to increase a value of an abnormality determination timer te2 by "1". The value of the abnormality determination timer te2 is set to "0" when the ignition switch is turned on.

Subsequently, the driving support ECU 10 outputs, at a step S111, a no-driving-operation warning instruction to the warning ECU 80. Accordingly, the warning ECU 80 makes a warning sound from the buzzer 81, makes a warning lamp blink on the indicator 82, and displays a warning message urging the driver to operate any one of "the accelerator pedal 11a, the brake pedal 12a, and the steering wheel SW".

Subsequently, the driving support ECU 10 determines, at a step S112, whether or not the current vehicle speed SPD of the own vehicle is less than or equal to a first vehicle speed SPD1. When the vehicle speed SPD is greater than the first vehicle speed SPD1 (S112: No), the driving support ECU 10 decelerates, at a step S113, the own vehicle at a deceleration-under-the-temporarily-abnormal-state ae set in advance, and tentatively terminates the routine under the normal state. It should be noted that the first vehicle speed SPD1 is set to a value lower than the abnormality determination permission vehicle speed SPD0. Besides, the deceleration-under-the-temporarily-abnormal-state ae is set to a value, an absolute value thereof is smaller than the absolute value of the deceleration-under-the-abnormal-state a.

When the driving operation by the driver is detected (S109: Yes) in the middle of the repetition of the processes stated above, the driving support ECU 10 proceeds to a step S114 to set the temporary abnormality flag Fet to "0", and at a step S105, clears the value of the abnormality determination timer te2 to zero. Therefore, the value of the abnormality determination timer te2 represents a time during which the state-with-no-driving-operation continues after the temporary abnormality flag Fet was set to "1".

On the other hand, when the vehicle speed SPD becomes less than or equal to the first vehicle speed SPD1 without any driving operation by the driver being detected, the driving support ECU 10 proceeds to a step S116 to determine whether or not the value of the abnormality determination timer te2 is more than or equal to an abnormality confirmation time te2ref. When the value of the abnormality determination timer te2 is less than the abnormality confirmation time te2ref (S116: No), the driving support ECU 10 keeps the vehicle speed at the current vehicle speed at a step S117. In this case, the driving support ECU 10 outputs to the engine ECU 30 and the brake ECU 40 an instruction signal for making the own vehicle travel at a constant speed of the current vehicle speed SPD obtained based on the signal from the vehicle speed sensor 16. Accordingly, a traveling state of the own vehicle is switched from a decelerated traveling which has been performed until that time to a traveling at a constant speed (a constant speed traveling). It should be noted that the vehicle speed kept at the step S117 is preferred to be set by a method similar to the method of the aforementioned step S35.

The driving support ECU 10 repeats the processes stated above, and when the value of the abnormality determination timer te2 has become more than or equal to the abnormality confirmation time te2ref (S116: Yes), the driving support ECU 10 sets, at the step S118, the abnormality flag Fe to "1" in place of the temporary abnormality flag Fet (Fet=0, Fe=1). Accordingly, it is confirmed that the driver is in the abnormal state.

According to the modification example 1 of the routine under the normal state described above, when the state-with-no-driving-operation has continued for more than or equal to the temporary abnormality confirmation time te1ref (S107: Yes), the driver's state is set to "temporarily abnormal" (S108), the warning is raised to the driver (S111), and the deceleration of the vehicle is started (S113). Then, when the vehicle speed SPD has decreased less than or equal to the first vehicle speed SPD1 with the state-with-no-driving-operation being kept, if the state-with-no-driving-operation has not continued for more than or equal to the predetermined time (the abnormality confirmation time te2ref) from the point in time at which "temporarily abnormal" was set, a traveling state of the own vehicle is switched from the decelerated traveling to the constant speed traveling. Accordingly, the own vehicle is made to wait with a state in which the own vehicle is traveling. By making the vehicle travel at a constant speed as mentioned above, it becomes possible to ensure a time for determining whether or not the driver is in the abnormal state. Therefore, the help signal can be transmitted to the help net center HNC at a timing at which the determination accuracy (estimation accuracy) of the driver's abnormal state has been surely raised (at a timing at which a possibility that the driver is in the abnormal state has become very high). Accordingly, erroneous reports to the help net center HNC can be suppressed.

It should be noted that in this example, a switch from "temporarily abnormal" to "abnormal" is performed based on both of the vehicle speed SPD and the elapsed time after the driver's state having been set to "temporarily abnormal". However, the switch from "temporarily abnormal" to "abnormal" is not necessarily performed based on these two conditions. For example, the switch from "temporarily abnormal" to "abnormal" may be performed based only on either of the following two conditions; one is a condition that the vehicle speed SPD has decreased less than or equal to the first vehicle speed SPD1 with the state-with-no-driving-operation being kept after the driver's state having been set to "temporarily abnormal", and the other is a condition that the state-with-no-driving-operation has continued for more than or equal to the abnormality confirmation time te2ref after the driver's state having been set to "temporarily abnormal". Further, other conditions may be also combined.

The vehicle traveling control apparatuses according to the present embodiment and modification examples have been described. However, the present invention is not limited to the aforementioned embodiment and the modification examples and may adopt various modifications within a scope of the present invention.

For example, in the present embodiment, the abnormality determination of the driver is performed based on the duration time of the state-with-no-driving-operation. However, the abnormality determination of the driver may be performed by making use of a so-called "driver monitor technique" which is disclosed in Japanese Patent Application Laid-Open (kokai) No. 2013-152700 and the like. More specifically, a camera for photographing a driver is provided on an interior member of a vehicle (for example, a steering wheel, a pillar, and the like). The driving support ECU 10 monitors a direction of a driver's line of sight or a driver's face direction using the photographed image by the camera. The driving support ECU 10 determines that the driver is in the abnormal state when the driver's line of sight or the driver's face direction has been in a certain direction for more than or equal to a predetermined time, wherein the certain direction is a direction to which the driver's line of sight or the driver's face direction does not face while driving normally.

In addition, the abnormality determination of the driver may be performed using the confirmation button 20. More specifically, the driving support ECU 10 urges the driver to operate the confirmation button 20 by the indication and/or the sound every time a first time elapses, and determines that the driver is in the abnormal state when a state with no operation of the confirmation button 20 has continued for more than or equal to a second time longer than the first time.

The abnormality determination using the photographed image or the confirmation button 20 described above can be used also when performing the determination of "temporarily abnormal" (S104) and the abnormality continuation determination after reporting to the help net center HNC (S62).

Further, in the present embodiment, the abnormality determination of the driver is performed under the situation where a traveling support control (ACC in the present embodiment) which makes the vehicle travel without the accelerator pedal operation by the driver is being performed, and when the driver's abnormality is detected, the traveling control which makes the vehicle decelerate or stop in place of ACC is performed. However, even under the situation where the ACC is not being performed, when the driver's abnormality is detected, the traveling control which makes the vehicle decelerate or stop may be performed by conducting the aforementioned each control routine.

The invention claimed is:

1. A vehicle traveling control apparatus applied to a vehicle, comprising:
an electronic control unit configured to:
continuously determine whether or not a driver of the vehicle is in an abnormal state where the driver loses an ability to drive the vehicle;
transmit a help signal to a help net center based on a determination result that the driver is in the abnormal state, the help signal representing that the driver is in the abnormal state;
stop the vehicle by decreasing a vehicle speed of the vehicle under a condition that, after transmitting the help signal, a stop permission signal has been received from the help net center
start decelerating the vehicle from a temporary abnormality determination point in time which is a timing at which the driver has been first determined to be in a temporary abnormal state;
determine that the driver is in the abnormal state when both a condition that the vehicle speed decreases to a predetermined vehicle speed and a condition that the temporary abnormal state has extended for a predetermined time are satisfied; and
maintain a current vehicle speed until at least the predetermined time elapses after the temporary abnormality determination point in time when the predetermined time has not elapsed at a timing when the vehicle speed has decreased to the predetermined vehicle speed.

2. The vehicle traveling control apparatus according to claim 1, wherein the electronic control unit is configured to, after transmitting the help signal, not stop the vehicle until the stop permission signal has been received from the help net center.

3. The vehicle traveling control apparatus according to claim 1, wherein the electronic control unit is configured to, after transmitting the help signal, maintain the vehicle speed of the vehicle at the current vehicle speed until the stop permission signal has been received from the help net center.

4. The vehicle traveling control apparatus according to claim 2, wherein the electronic control unit is configured to, after transmitting the help signal, maintain the vehicle speed of the vehicle at the current vehicle speed until the stop permission signal has been received from the help net center.

5. The vehicle traveling control apparatus according to claim 1, wherein the stopping the vehicle includes decreasing the vehicle speed of the vehicle to zero.

6. A vehicle traveling control method applied to a vehicle, comprising:
continuously determining whether or not a driver of the vehicle is in an abnormal state where the driver loses an ability to drive the vehicle;
transmitting a help signal to a help net center based on a determination result that the driver is in the abnormal state, the help signal representing that the driver is in the abnormal state;
stopping the vehicle by decreasing a vehicle speed of the vehicle under a condition that, after transmitting the help signal, a stop permission signal has been received from the help net center;
starting decelerating the vehicle from a temporary abnormality determination point in time which is a timing at which the driver has been first determined to be in a temporary abnormal state;
determining that the driver is in the abnormal state when both a condition that the vehicle speed decreases to a predetermined vehicle speed and a condition that the temporary abnormal state has extended for a predetermined time are satisfied; and
maintaining a current vehicle speed until at least the predetermined time elapses after the temporary abnormality determination point in time when the predetermined time has not elapsed at a timing when the vehicle speed has decreased to the predetermined vehicle speed.

7. The vehicle traveling control method according to claim 6, further comprising, after transmitting the help signal, not stopping the vehicle until the stop permission signal has been received from the help net center.

8. The vehicle traveling method according to claim 6, further comprising, after transmitting the help signal, maintaining the vehicle speed of the vehicle at the current vehicle speed until the stop permission signal has been received from the help net center.

9. The vehicle traveling method according to claim 7, further comprising, after transmitting the help signal, maintaining the vehicle speed of the vehicle at the current vehicle speed until the stop permission signal has been received from the help net center.

10. The vehicle traveling method according to claim 6, wherein the stopping the vehicle includes decreasing the vehicle speed of the vehicle to zero.

* * * * *